United States Patent
Mizukami et al.

(10) Patent No.: US 12,064,870 B2
(45) Date of Patent: Aug. 20, 2024

(54) SOUNDPROOFING DEVICE, ROBOT APPARATUS, METHOD FOR CONTROLLING ROBOT APPARATUS, AND PROGRAM

(71) Applicant: SONY CORPORATION, Tokyo (JP)

(72) Inventors: Osamu Mizukami, Kanagawa (JP); Takuma Araki, Tokyo (JP); Ayanori Koizumi, Kanagawa (JP); Goushi Koike, Tokyo (JP); Hidenori Ishibashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 677 days.

(21) Appl. No.: 16/971,915

(22) PCT Filed: Dec. 21, 2018

(86) PCT No.: PCT/JP2018/047260
§ 371 (c)(1),
(2) Date: Aug. 21, 2020

(87) PCT Pub. No.: WO2019/167400
PCT Pub. Date: Sep. 6, 2019

(65) Prior Publication Data
US 2021/0094191 A1    Apr. 1, 2021

(30) Foreign Application Priority Data
Feb. 28, 2018 (JP) ................. 2018-035734

(51) Int. Cl.
*B25J 19/00* (2006.01)
*A63H 11/20* (2006.01)
*B25J 13/00* (2006.01)
*B32B 5/24* (2006.01)
*G10K 11/16* (2006.01)

(52) U.S. Cl.
CPC .............. *B25J 19/00* (2013.01); *A63H 11/20* (2013.01); *G10K 11/16* (2013.01); *B25J 13/00* (2013.01); *B32B 5/24* (2013.01)

(58) Field of Classification Search
CPC .. B25J 19/00; B25J 13/00; B32B 5/24; G10K 11/16; A63H 11/20
See application file for complete search history.

(56) References Cited

U.S. PATENT DOCUMENTS

| | | | |
|---|---|---|---|
| 5,258,089 A * | 11/1993 | Tanaka | B29C 44/445 156/291 |
| 5,582,906 A * | 12/1996 | Romesberg | B29C 43/30 428/319.7 |
| 7,147,716 B1 * | 12/2006 | Boukobza | B32B 37/1207 156/286 |
| 7,490,893 B2 * | 2/2009 | Asbury | B32B 37/1284 296/214 |

(Continued)

FOREIGN PATENT DOCUMENTS

| | | |
|---|---|---|
| CN | 101918180 A | 12/2010 |
| JP | S62-231741 A | 10/1987 |

(Continued)

*Primary Examiner* — Forrest M Phillips
(74) *Attorney, Agent, or Firm* — Paratus Law Group, PLLC

(57) ABSTRACT

A soundproofing device includes: a first layer (911) having sound absorbing properties; and a second layer (912) including elastic fibers.

15 Claims, 30 Drawing Sheets

(56) References Cited

U.S. PATENT DOCUMENTS

| | | | | |
|---|---|---|---|---|
| 9,243,402 | B2 * | 1/2016 | Stopin | C08L 95/00 |
| 10,040,407 | B2 * | 8/2018 | Nomura | B32B 15/085 |
| 2006/0065482 | A1 * | 3/2006 | Schmidft | E04B 1/625 |
| | | | | 181/290 |
| 2008/0073146 | A1 * | 3/2008 | Thompson, Jr. | B60R 13/011 |
| | | | | 181/290 |
| 2010/0065366 | A1 * | 3/2010 | Soltau | B60R 13/083 |
| | | | | 264/46.4 |
| 2014/0224407 | A1 | 8/2014 | Blanchard | |
| 2017/0200441 | A1 * | 7/2017 | Mohammadi Gojani | |
| | | | | B32B 9/041 |

FOREIGN PATENT DOCUMENTS

| | | |
|---|---|---|
| JP | H07-165962 A | 6/1995 |
| JP | 2000-291219 A | 10/2000 |
| JP | 2001-191275 A | 7/2001 |
| JP | 2003-000960 A | 1/2003 |
| JP | 2008-051123 A | 3/2008 |
| JP | 2012-158039 A | 8/2012 |
| KR | 20090020417 A | 2/2009 |
| KR | 20160000099 U | 1/2016 |

\* cited by examiner

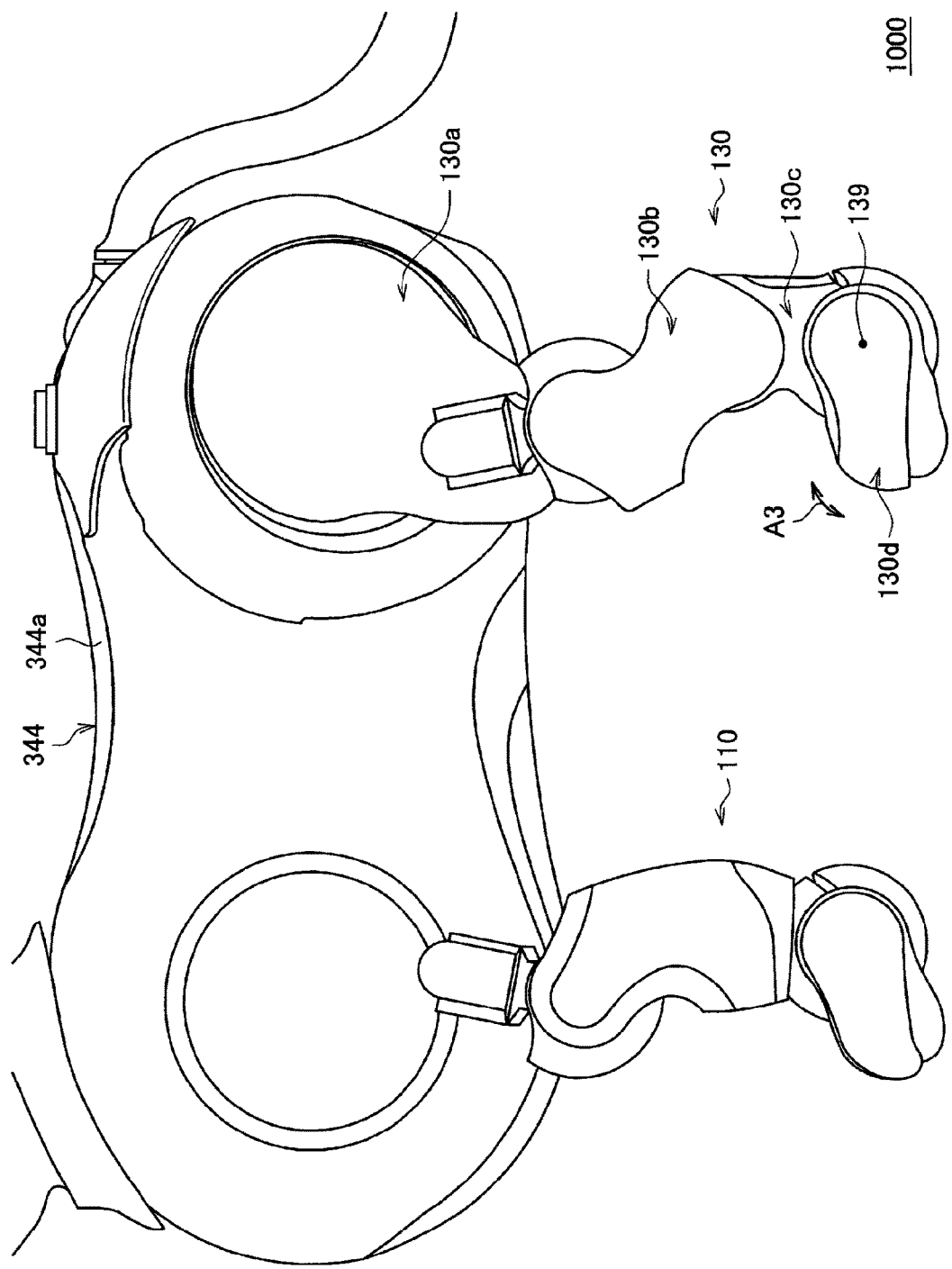

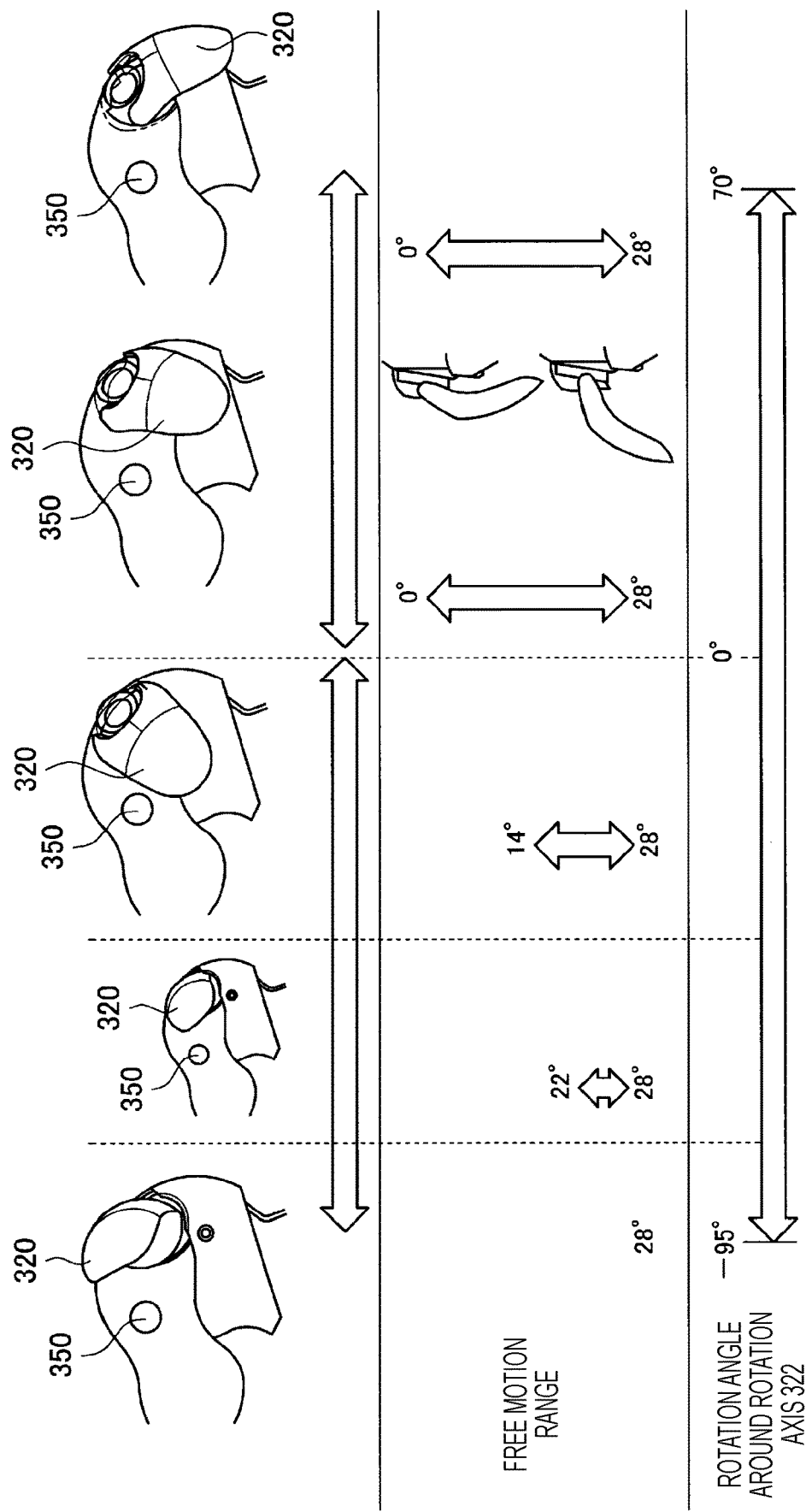

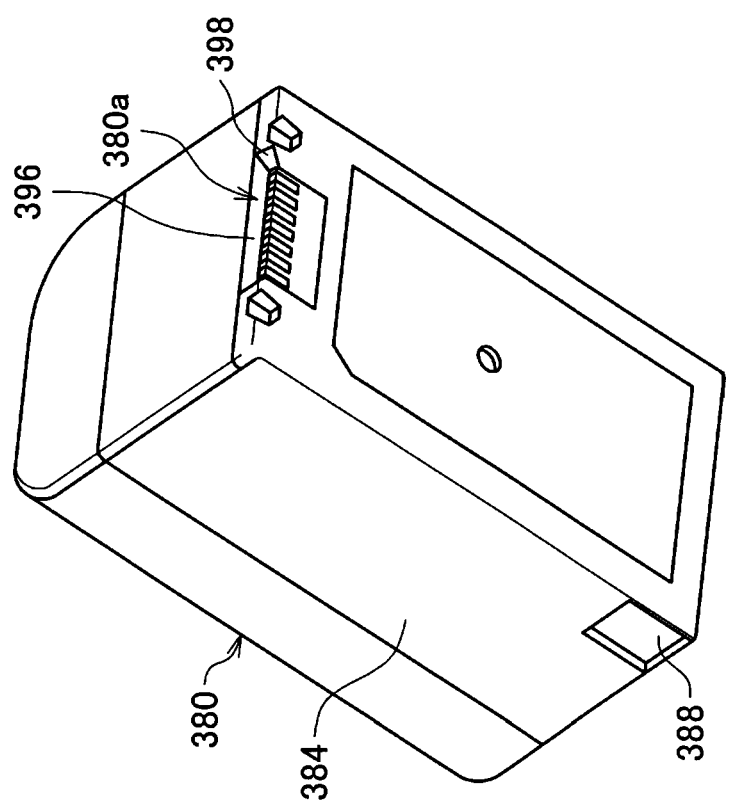
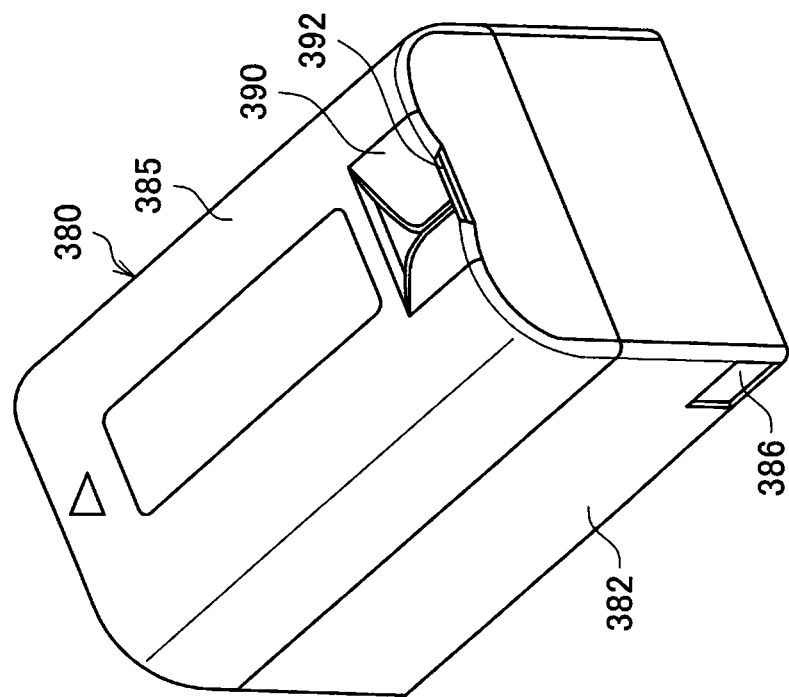
FIG. 13

FIG. 19
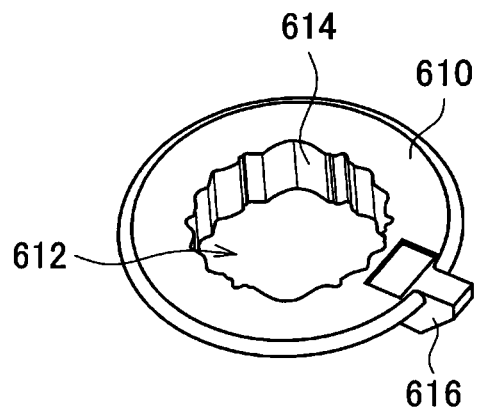
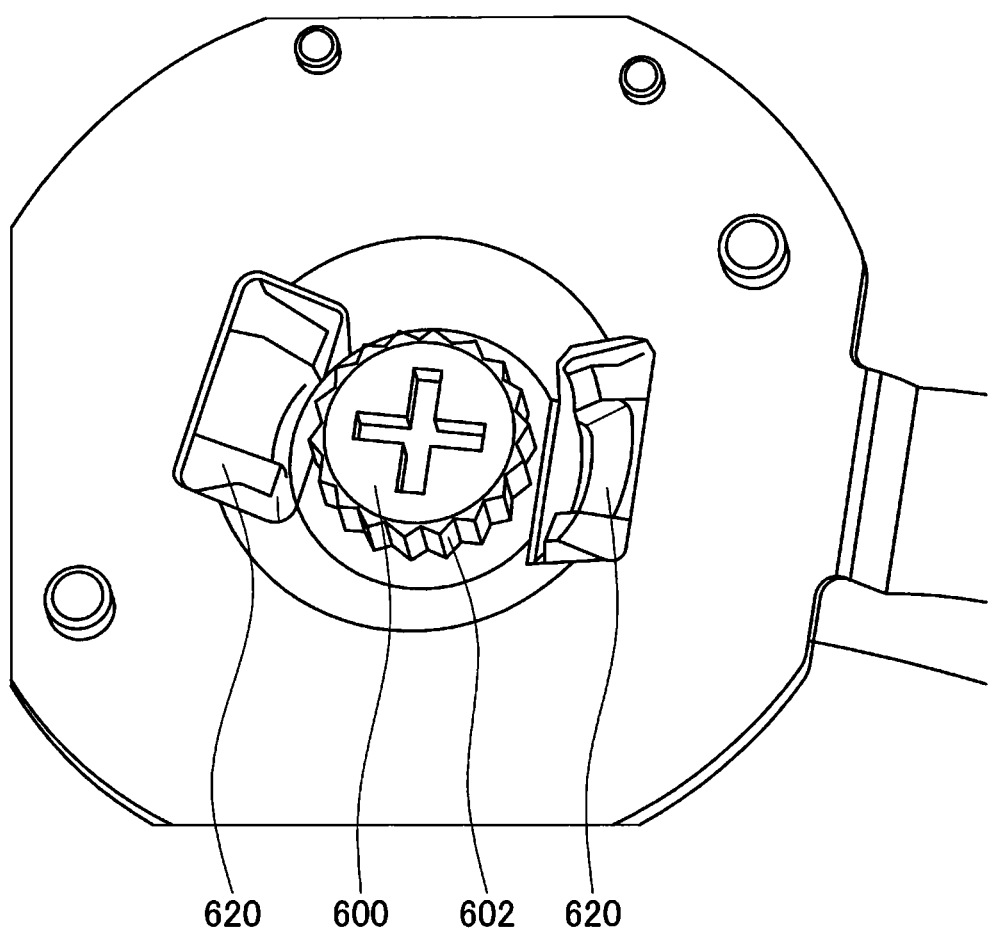

FIG. 25
A
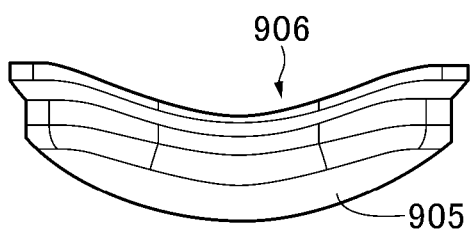
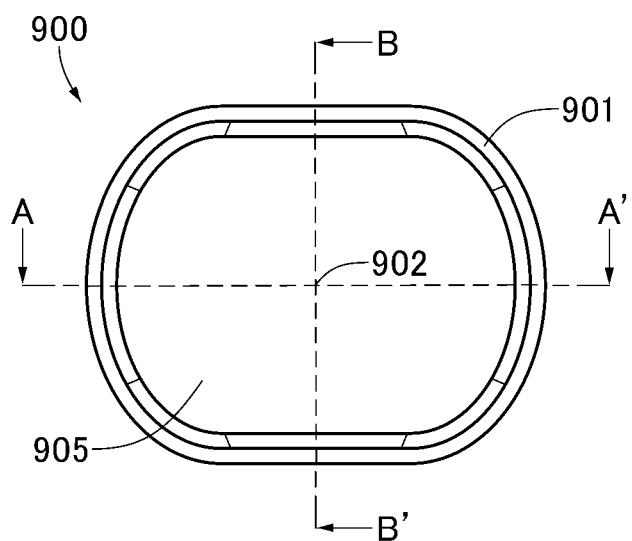 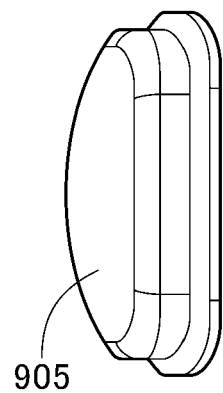
B
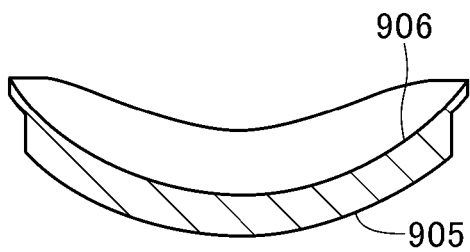
C
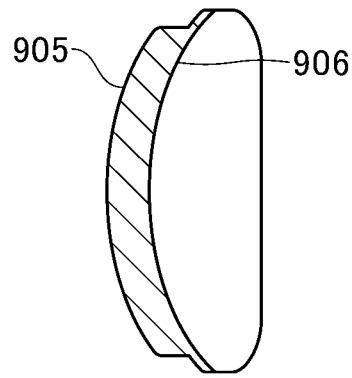

(GROUND SIDE)

SOUNDPROOFING DEVICE, ROBOT APPARATUS, METHOD FOR CONTROLLING ROBOT APPARATUS, AND PROGRAM

CROSS REFERENCE TO PRIOR APPLICATION

This application is a National Stage Patent Application of PCT International Patent Application No. PCT/JP2018/047260 (filed on Dec. 21, 2018) under 35 U.S.C. § 371, which claims priority to Japanese Patent Application No. 2018-035734 (filed on Feb. 28, 2018), which are all hereby incorporated by reference in their entirety.

TECHNICAL FIELD

The present disclosure relates to a soundproofing device, a robot apparatus, a method for controlling a robot apparatus, and a program.

BACKGROUND ART

Conventionally, devices for anti-sliding or soundproofing have been proposed (see, for example, Patent Document 1 below).

CITATION LIST

Patent Document

Patent Document 1: Japanese Patent Application Laid-Open No. 2000-291219

SUMMARY OF THE INVENTION

Problems to be Solved by the Invention

In such field, it is desirable that, for example, a soundproofing device intended for preventing sound has a configuration suitable for an apparatus to which the soundproofing device is applied.

An object of the present disclosure is to provide a soundproofing device having a configuration suitable for an apparatus to which the soundproofing device is applied. In addition, another object of the present disclosure is to provide a robot apparatus to which the soundproofing device is attachable, a method for controlling the robot apparatus, and a program.

Solutions to Problems

The present disclosure is, for example, a soundproofing device including:
a first layer having a sound absorbing property; and
a second layer including an elastic fiber.

The present disclosure is, for example, a robot apparatus including:
a grounding unit; and
a control unit, in which
the control unit performs control to correct a motion in a case where a soundproofing device is attached to the grounding unit.

The present disclosure is, for example, a method for controlling a robot apparatus, the method including:
correcting a motion in a case where a soundproofing device is attached to a grounding unit, the correcting being performed by a control unit.

The present disclosure is, for example, a program causing a computer to execute a method for controlling a robot apparatus, the method including:
correcting a motion in a case where a soundproofing device is attached to a grounding unit, the correcting being performed by a control unit.

Effects of the Invention

According to at least one embodiment of the present disclosure, a soundproofing device having a configuration suitable for an apparatus to which the soundproofing device is applied can be provided. Furthermore, a robot apparatus or the like to which the soundproofing device is attachable can be provided. Note that the effects described above are not restrictive, and any of effects described in the present disclosure may be included. In addition, the contents of the present disclosure are not to be construed as being limited by the illustrated effects.

BRIEF DESCRIPTION OF DRAWINGS

FIG. 5 is a schematic diagram illustrating the left side of the robot apparatus according to an embodiment of the present disclosure.

FIG. 8B is a schematic diagram for explaining movement of the ear of the robot apparatus according to an embodiment of the present disclosure.

FIG. 13 is a schematic diagram illustrating a configuration of a battery for the robot apparatus according to an embodiment of the present disclosure.

FIG. 19 is a schematic diagram illustrating a screw for the robot apparatus according to an embodiment of the present disclosure and a cover for hiding the screw.

FIG. 25 is a diagram for explaining an example shape of the soundproofing device according to an embodiment of the present disclosure.

MODE FOR CARRYING OUT THE INVENTION

Figure 1:
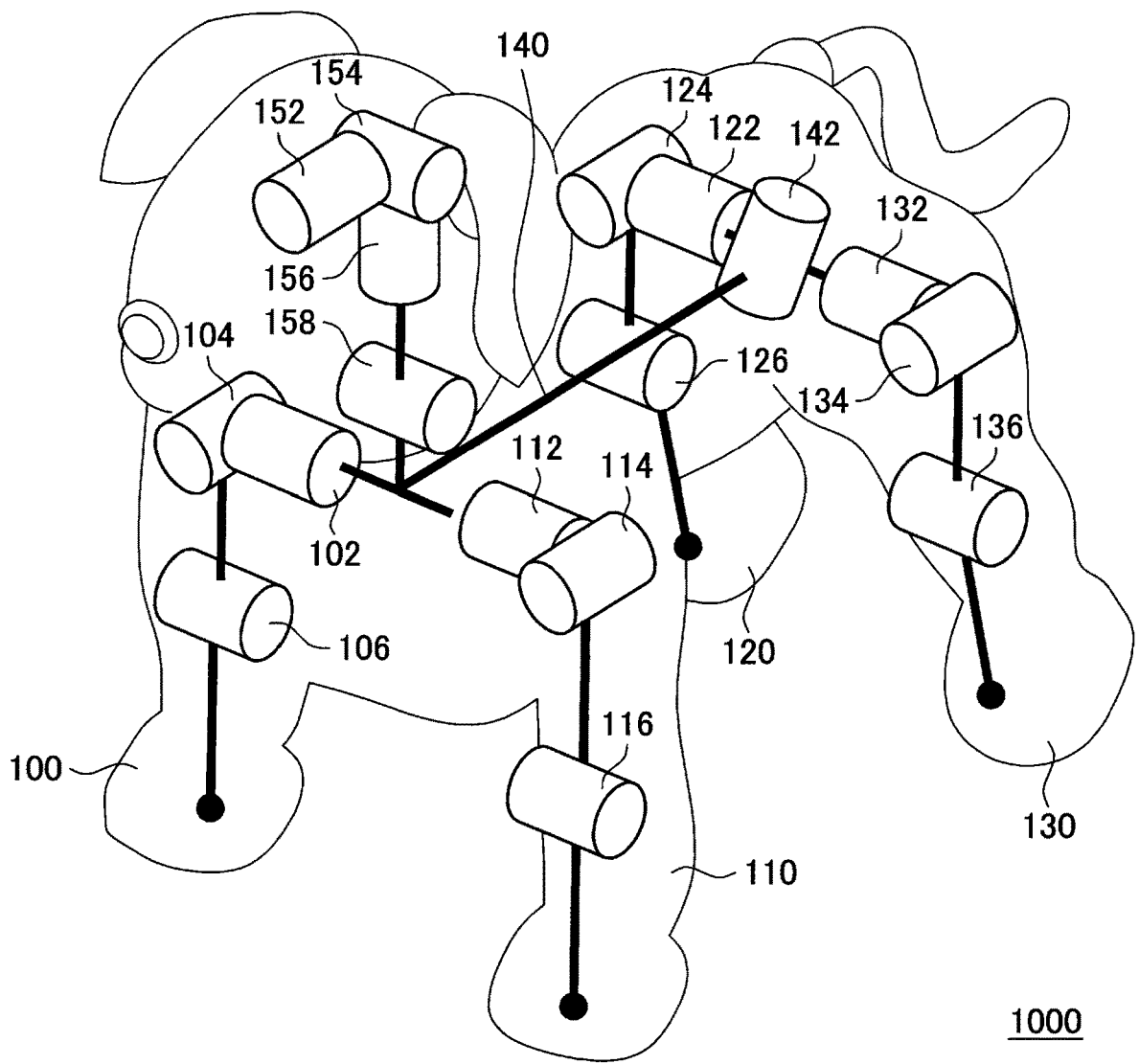
FIG. 1 is a schematic diagram illustrating an appearance of a robot apparatus and rotation axes of joints according to an embodiment of the present disclosure.

Preferred embodiments of the present disclosure will now be described in detail with reference to the accompanying drawings. Note that, in the description and the drawings, components having substantially the same functions and configurations are denoted by the same reference numerals and redundant descriptions are omitted.

Note that descriptions will be provided in the order shown below.

One Embodiment

[Hardware Configuration of Robot Apparatus]

Example Configuration of System to which Robot Apparatus is Applied

[Soundproofing device applied to robot apparatus]

MODIFICATIONS

One Embodiment

[Hardware Configuration of Robot Apparatus]
(Configuration of Joint)

FIG. 1 is a schematic diagram illustrating an appearance of a robot apparatus 1000, which is an example of an autonomous moving body, and rotation axes of joints. The robot apparatus 1000 includes four legs 100, 110, 120, and 130 each driven by an electric motor such as a servomotor.

As shown in FIG. 1, the robot apparatus 1000 includes a plurality of joints. Here, for convenience of explanation, the robot apparatus 1000 is divided into a right foreleg system, a left foreleg system, a right hind leg system, a left hind leg system, a body system, and a head system, on the basis of motions of the robot apparatus 1000. The right foreleg system includes a joint 102, a joint 104, and a joint 106. The left foreleg system includes a joint 112, a joint 114, and a joint 116. The right hind leg system includes a joint 122, a joint 124, and a joint 126. The left hind leg system includes a joint 132, a joint 134, and a joint 136. Furthermore, the body system includes a joint 142. The head system includes a joint 152, a joint 154, a joint 156, and a joint 158. Each of these systems is connected to a body 140. Note that each joint shown in FIG. 1 represents a main joint driven by an electric motor. In addition to the joints shown in FIG. 1, the robot apparatus 1000 includes a joint that moves as a follower in accordance with the movement of another joint. Furthermore, the robot apparatus 1000 includes a plurality of movable parts such as a mouth, an ear, and a tail, and these movable parts are also driven by electric motors or the like.

FIG. 1 shows each joint in the form of a cylinder. In each joint, the central axis of the cylinder corresponds to the rotation axis of the joint. Therefore, a joint may be referred to as a rotation axis.

In the present embodiment, the number of joints is increased relative to conventional robot apparatuses. The joint 152 is disposed in the head system, whereby the robot apparatus 1000 can perform a motion of tilting the neck left and right when viewed from the front. Furthermore, the joint 142 is disposed in the body system, whereby the robot apparatus 1000 can perform a motion of swinging the hips left and right when viewed from above. As a result, the robot apparatus 1000 can perform more various motions than before.

Each joint is driven by an electric motor (hereinafter simply referred to as a motor) such as a servomotor. Note that the drive source is not particularly limited. The motor for each joint is housed in a single box together with a gear mechanism and a microcontroller for driving the motor. The box includes a resin material (such as plastic). The motor and the gear mechanism are housed and sealed in a single box, and thus the quietness of the robot apparatus 1000 can be improved.

As a box for housing the motor, gear mechanism, and a microcontroller, a two-axis box and a single-axis box are available. For the right hind leg system, for example, the motor, the gear mechanism, and the microcontroller for the joint 132 and the joint 134 are housed in a single box 200 that includes two rotation axes. On the other hand, the motor, the gear mechanism, and the microcontroller for the joint 136 are housed in a single box 210 that includes a single rotation axis.

In the present embodiment, two rotation axes, in particular, are housed in a single box 200 so that a spherical joint can be achieved. Furthermore, housing two rotation axes in a single box makes it possible to reduce the space for a joint and determine the shape of the robot apparatus 1000 placing importance on the design.

Each of the systems such as the aforementioned right foreleg system is controlled by a microcomputer included in each joint. Among these joints, the joint 158 for the head system, for example, is configured to be electrically braked. If the joint 158 is allowed to rotate freely when the power is turned off, for example, the head may fall down and hit the user's hand or the like. Applying a brake to the joint 158 can avoid such a situation. The brake can be realized by a method that includes identifying rotation of the motor on the basis of an electromotive force generated by the rotating motor for the joint 158 when the power is turned off, and generating a driving force in a direction opposite to the direction in which the motor is to rotate.

(Mechanism for Moving Legs)

Figure 2:
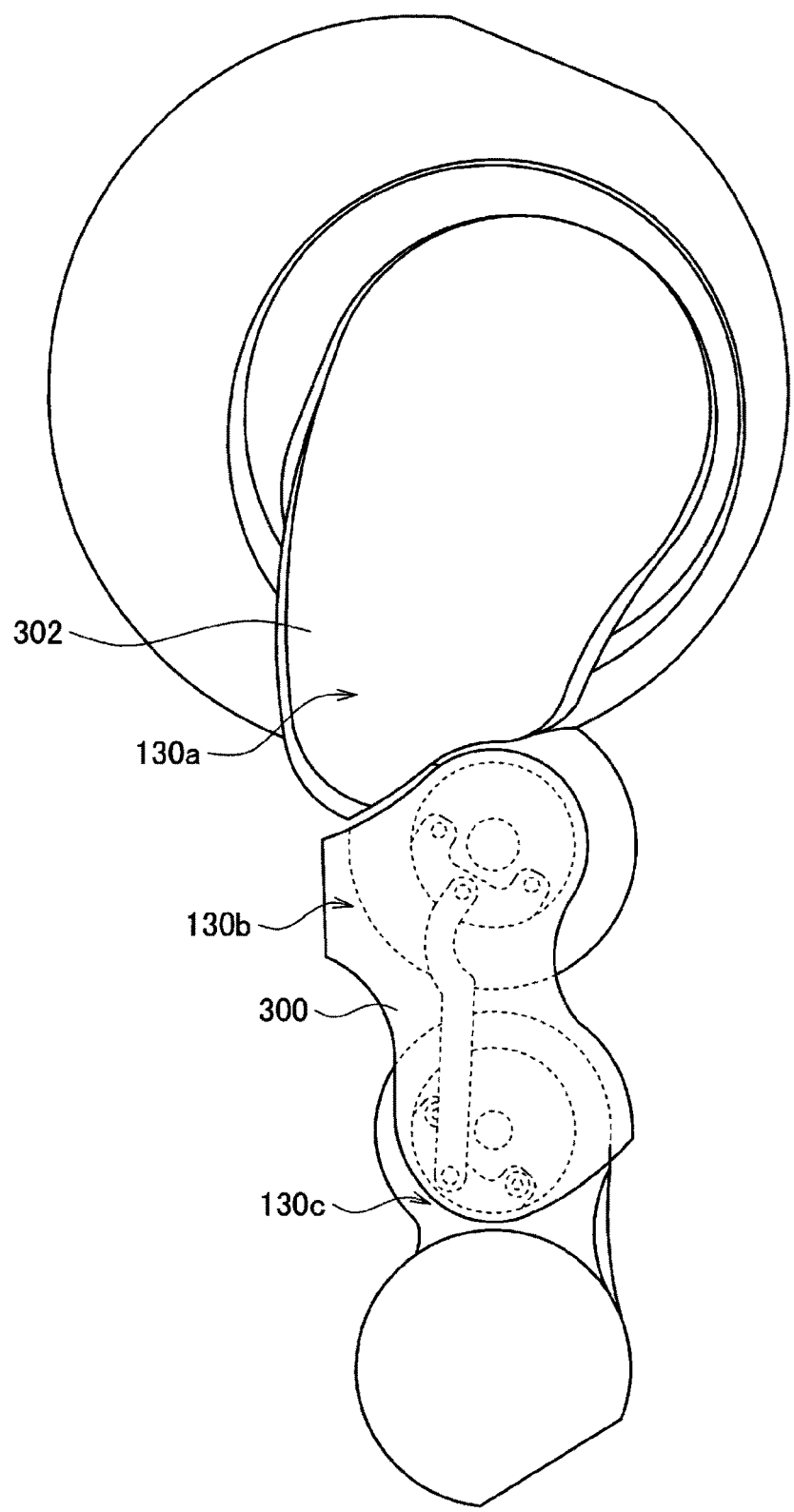
FIG. 2 is a schematic diagram illustrating a left hind leg of the robot apparatus according to an embodiment of the present disclosure as viewed from the left side of the robot apparatus.

The following describes a mechanism for moving lower legs in detail taking the left hind leg system as an example. Note that each of the other legs is configured in a similar manner to the left hind leg system. FIG. 2 is a schematic diagram illustrating a left hind leg 130 as viewed from the left side of the robot apparatus 1000. The left hind leg 130 includes an arm 130*a*, an arm 130*b*, and an arm end 130*c*. In the arm 130*a*, both a box 200 having two rotation axes and a box 210 having a single rotation axis are disposed.

Figure 3:
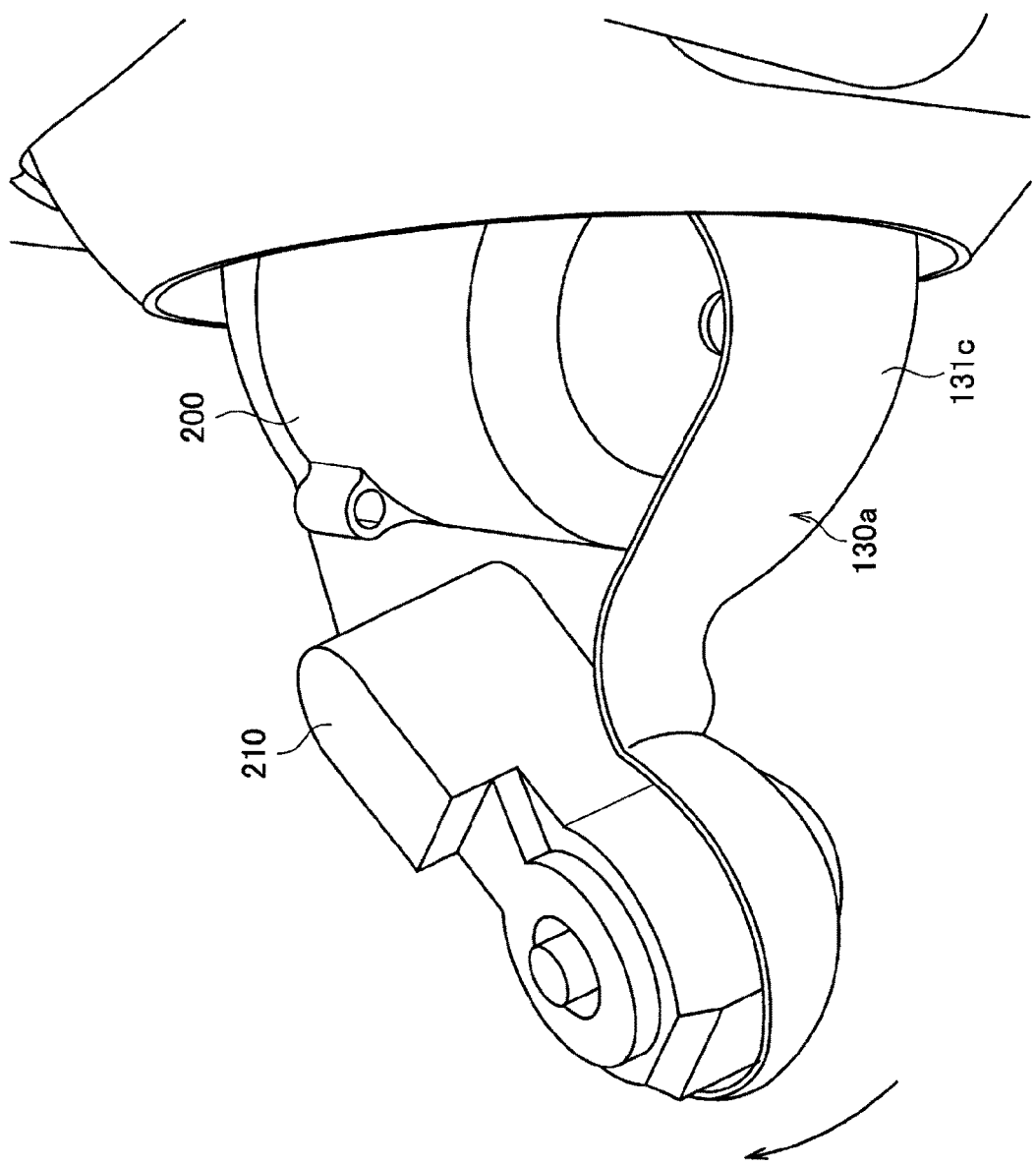
FIG. 3 is a schematic diagram illustrating a state where the cover covering the arm shown in FIG. 2 is removed.

FIG. 3 illustrates a state where a cover 302 covering the arm 130*a* shown in FIG. 2 is removed, showing the arm 130*a* of the left foreleg being rotated in the direction indicated by the arrow in FIG. 3. Note that illustration of the arm 130*b* and the arm end 130*c* is omitted in FIG. 3. As illustrated in FIG. 3, the box 200 having two rotation axes and the box 210 having a single rotation axis are disposed in the arm 130*a*. The box 200 includes a rotation axis 132 and a rotation axis 134, and the box 210 includes a rotation axis 136. All the boxes 200 and 210 including motors and the like for driving the left hind leg 130 are collectively placed in the single arm 130*a*, whereby the space of the other arm 130*b* can be used for other functions to achieve effective use of the space. Furthermore, the box 200 including two rotation axes is disposed in a connecting portion 131*a* between the arm 130*a* and the body 140, whereby the exterior of the connecting portion 131*c* can be made spherical.

Figure 4:
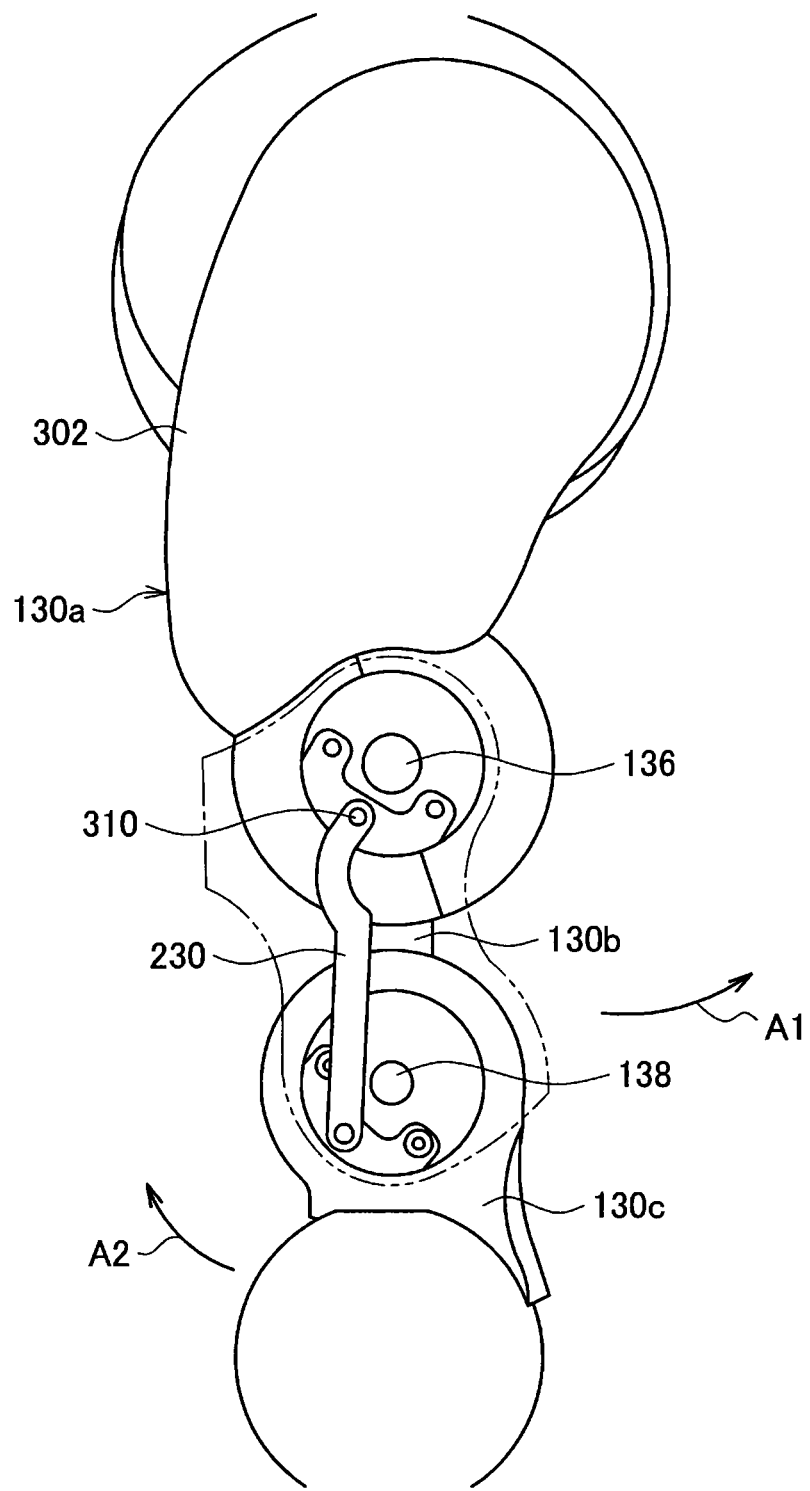
FIG. 4 is a schematic diagram illustrating a mechanism for driving an arm end according to an embodiment of the present disclosure.

Furthermore, FIG. 4 is a schematic diagram illustrating a mechanism for driving the arm end 130*c*, showing a state where a cover 300 disposed on the arm 130*b* shown in FIG. 2 is removed. The arm end 130*c* rotates with respect to the arm 130*b*, but no motor is disposed on the rotation axis 138 of the arm end 130*c*. On the other hand, as illustrated in FIG. 4, a link 230 connects the rotation axis 136 on which the arm 130*a* and the arm 130*b* rotate relative to each other and the rotation axis 138 on which the arm 130*b* and the arm end 130*c* rotate relative to each other. Therefore, in response to rotation of the arm 130*b* relative to the arm 130*a*, the arm end 130*c* rotates.

Specifically, when the arm 130*b* rotates relative to the arm 130*a* by the driving force of the motor disposed in the box 210 for the rotation axis 136, the position of the axis 310 on the upper side of the link 230 does not move with respect to the am 130*a*. Thus, for example, when the aria 130*b* rotates in the direction of the arrow A1 with respect to the arm 130*a*, the arm end 120*c* rotates in the direction of the arrow A2 with respect to the arm 120*b*. Accordingly, when the arm 120*b* rotates in the direction of the arrow A1 with respect to the arm 120*a* to make a motion of bending the knee of the right hind leg, the arm end 120*c*, which corresponds to the ankle, rotates in the direction of the arrow A2 to fulfill a motion of the ankle for squatting with the knee being bent.

Furthermore, when, for example, the robot apparatus is walking by lifting up the left hind leg, such mechanism causes the arm end 130*c* to rotate in the direction of the arrow A2 so that the tip of the arm end 130*c* is lifted, and thus the tip of the left foreleg is inhibited from being caught on the ground. Thus, the legs are allowed to lift to a smaller extent during walking, thereby achieving smoother and faster walking.

FIG. 5 is a schematic diagram illustrating the left side of the robot apparatus 1000. As shown in FIG. 5, a foot 130*d* is attached to the arm end 130*c*. The foot 130*d* is allowed to freely rotate in the direction of the arrow A3 around the rotation axis 139 serving as a center of rotation with respect to the arm end 130*c*. The foot 130*d* is biased by a spring (not illustrated) in the counterclockwise direction in FIG. 5 to a predetermined stepper position. As a result, when the robot apparatus 1000 is walking, the foot 130*d* can securely press the surface of a road (floor).

Figure 6A:
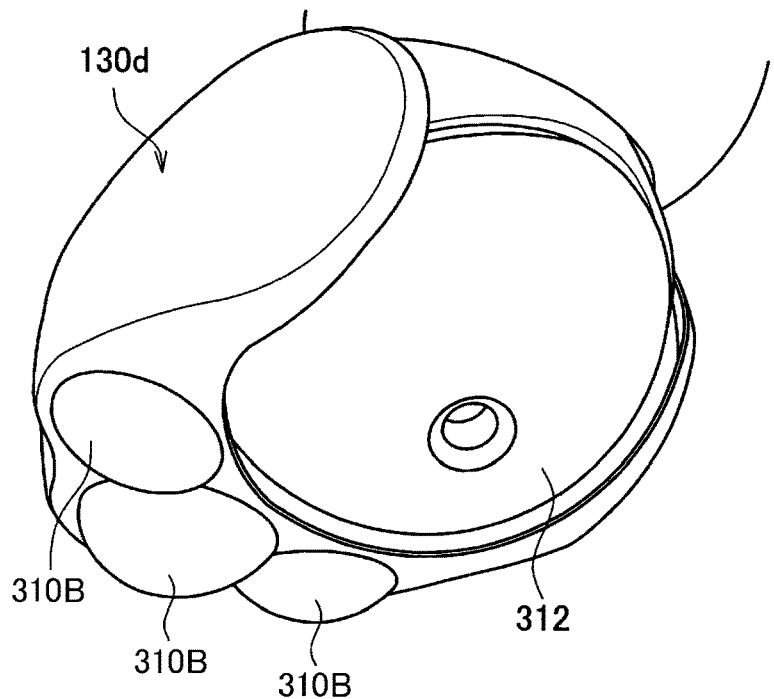
FIG. 6A is a schematic diagram illustrating the underside of a foot of the robot apparatus according to an embodiment of the present disclosure as viewed from below.
Figure 6B:
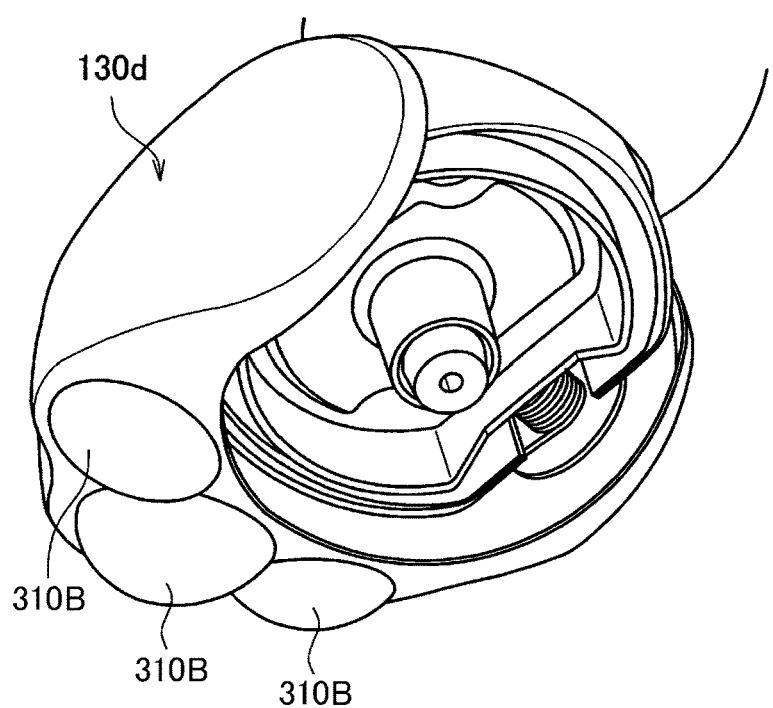
FIG. 6B illustrates a state where the paw pad is removed from the foot in FIG. 6A.

FIG. 6A is a schematic diagram illustrating the underside of the foot 130*d* as viewed from below. On the back of the foot 130*d*, three small paw pads 310B and one large paw pad 312 are disposed. Each of the three paw pads 310B includes a cushioning rubber material having relatively low hardness. On the other hand, the paw pad 312 is in a spherical shape and includes a rubber material having a higher hardness, or specifically a hardness close to the hardness of a plastic material. The paw pads 310B and the paw pad 312 each include a built-in load sensor. The paw pad 312 is removable and replaceable. FIG. 6B illustrates a state where the paw pad 312 is removed from the foot in FIG. 6A. When the paw pad 312 becomes worn, the user can remove the paw pad 312 and replace the paw pad 312 with a new one.

Furthermore, by replacing paw pads 312, the new paw pad 312 may include the same material as the paw pad 310B or fulfill a different function. Thus, it is possible to attach the paw pad 312 that performs a function most suitable for, for example, the material of the floor and the like. Moreover, the paw pad 312 can be replaced with a new one having a different color favored by the user.

Figure 6C:
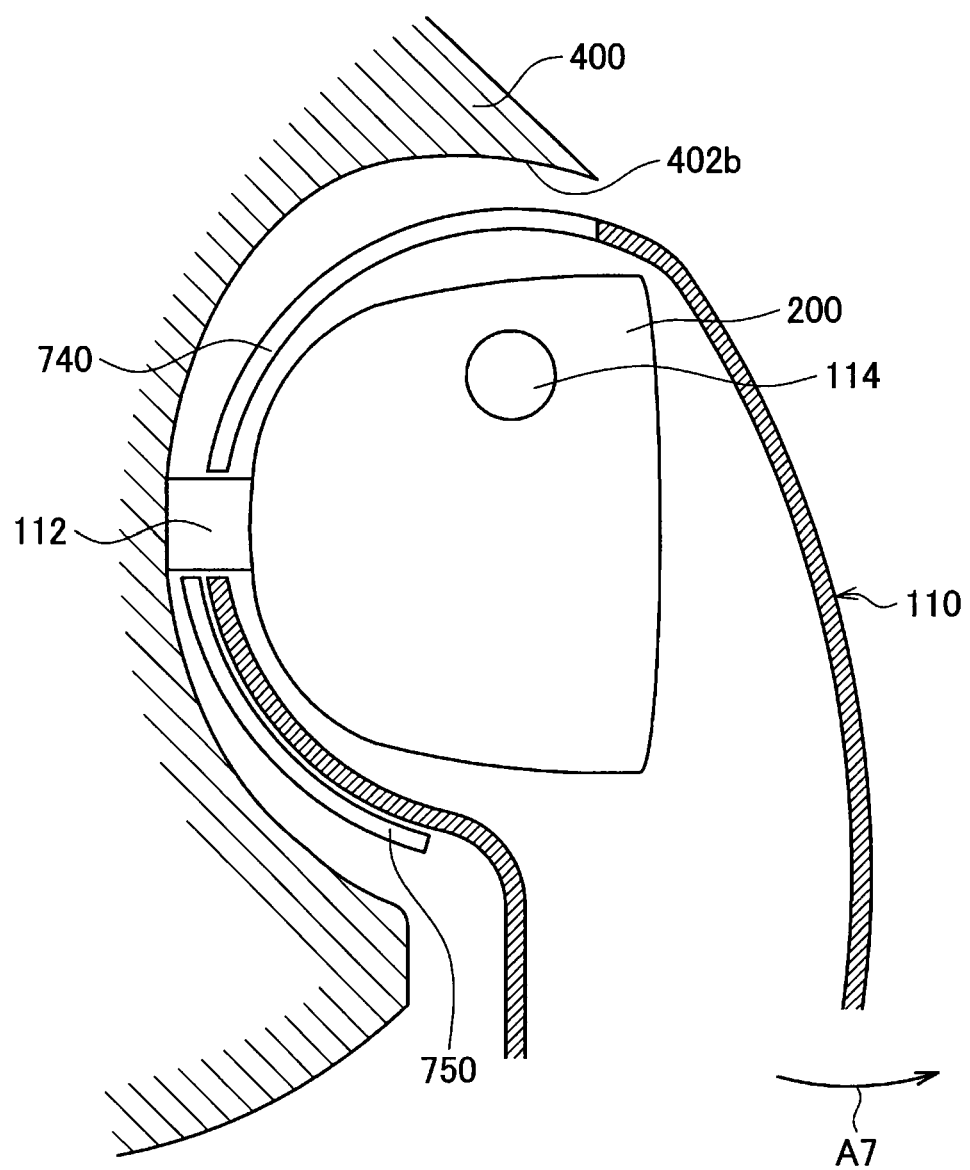
FIG. 6C is a schematic diagram illustrating a region around the base of the left foreleg of the robot apparatus according to an embodiment of the present disclosure.

FIG. 6C is a schematic diagram illustrating a region around the base of the left foreleg 110, showing a cross section viewed from the front side of the robot apparatus 1000. As illustrated in FIG. 6C, the rotation axis 112 and the rotation axis 114 at the base of the left foreleg 110 are housed in the two-axis box 200. The box 200 is housed in the left foreleg 110 with the rotation axis 114 fixed to the left foreleg 110. Furthermore, the rotation axis 112 is fixed to the body 140 (a frame 400 described later), whereby the box 200 is fixed to the frame 400.

As described above, a portion in the left foreleg 110 facing the frame 400 has a spherical shape and faces a concave region 402a in a part 402, which is described later. With such configuration, the left foreleg 110 is allowed to freely rotate with respect to the frame 400 when the rotation axis 112 and the rotation axis 114 are driven. Note that the other legs are configured in a similar manner to the leg in FIG. 6C.

As illustrated in FIG. 6C, the left foreleg 110 is driven in the direction of the arrow A7 when the rotation axis 114 is driven. To avoid interference with the rotation axis 112 during the driving, a groove 740 corresponding to the rotation axis 112 is disposed in the exterior of the left foreleg 110. Disposing the groove 740 allows the left foreleg 110 to rotate in the direction of the arrow A7 when the rotation axis 114 is driven.

On the other hand, when the left foreleg 110 illustrated in FIG. 6C rotates, for example, 90° or more in the direction of the arrow A7, the groove 740 may be rotated to a position where the groove does not face the frame 400, and the groove 740 may be exposed to the outside. In this case, a foreign matter can be caught in the groove 740. For this reason, a spherical cover 750 as shown in FIG. 6C is provided. The cover 750 is made spherical to match the shape of the adjacent left foreleg 110. With such configuration, when the left foreleg 110 is allowed to freely rotate by driving the rotation axis 114, which is one of the two axes, the groove 740 for avoiding interference with the other rotation axis 112 is prevented from being exposed to the outside. Note that the cover 750 may be moved in response to movement of the left foreleg 110. Furthermore, a spring for biasing the cover 750 in a predetermined direction may be disposed so that the cover 750 abuts on a predetermined stopper.

(Configuration of Ear)

Figure 7:
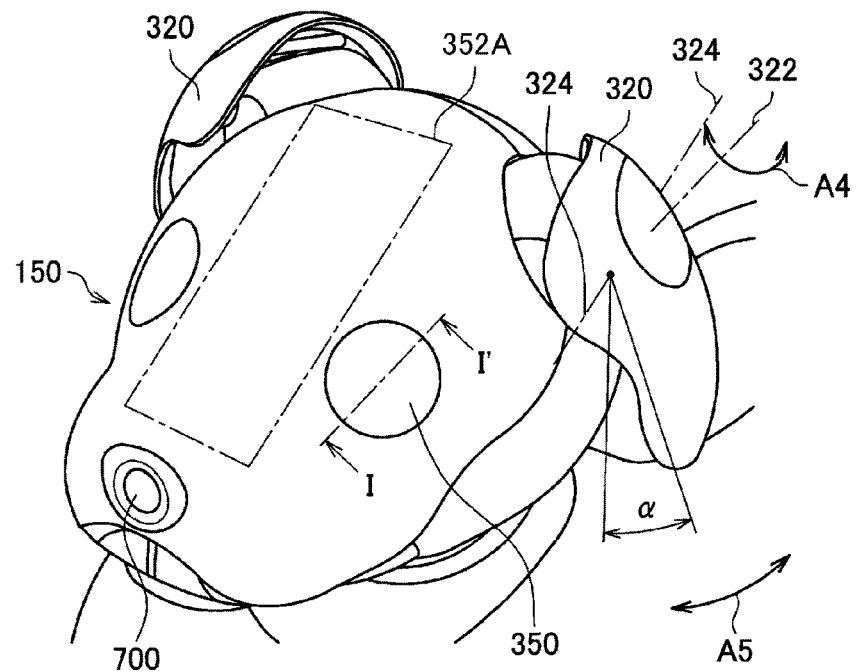
FIG. 7 is a schematic diagram illustrating the head of the robot apparatus according to an embodiment of the present disclosure.

FIG. 7 is a schematic diagram illustrating a head 150, or a face in particular, of the robot apparatus 1000. An ear 320 is disposed on the robot apparatus 1000. The ear 320 is caused to rotate in the direction of the arrow A4 by the driving force of a motor around a rotation axis 322 serving as a center of rotation. Furthermore, in addition to rotating in the direction of the arrow A4, the ear 320 of the robot apparatus 1000 rotates around a rotation axis 324 serving as a center of rotation in a direction in which the tip of the ear opens in a side-to-side direction (direction of the arrow A5) as viewed from the front. An angle α by which the ear 320 opens in the direction of the arrow A5 in FIG. 7 is referred to as an opening angle.

Figure 8A:
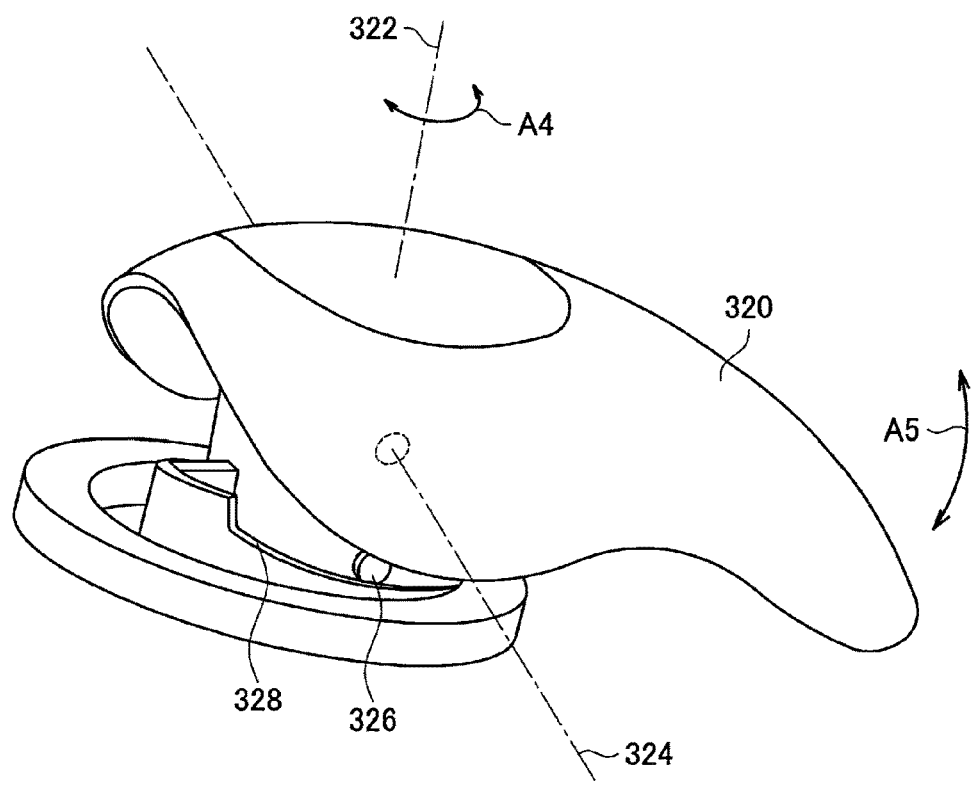
FIG. 8A is a schematic diagram illustrating an ear and its surroundings of the robot apparatus according to an embodiment of the present disclosure.

FIG. 8A is a schematic diagram illustrating the ear 320 and its surroundings in detail. The ear 320 is driven to rotate in the direction of the arrow A4 by the built-in motor around the rotation axis 322 serving as a center of rotation. As shown in FIG. 6A, the ear 320 is rotatable with respect to the rotation axis 324. Furthermore, a skew cam 328 fixed to the head 150 is disposed at the base of the ear 320. When the ear 320 rotates around the rotation axis 322 serving as a center of rotation in the direction of the arrow A4, a cam follower 326 disposed on the ear 320 slides on the skew cam 328. Therefore, the ear 320 rotates in the direction of the arrow A5 around the rotation axis 324 serving as a center of rotation.

FIG. 8B is a schematic diagram for explaining movement of the ear 320. The opening angle α of the ear 320 increases as the ear 320 rotates around the rotation axis 322 serving as a center of rotation so that the tip of the ear 320 rotates toward the front of the robot apparatus 1000. As an example, assuming that the opening angle α in the state where the ear 320 is most closed with respect to the side-to-side opening is 0 degrees, the ear 320 can open by a maximum opening angle of 28 degrees. As shown in FIG. 8B, when the ear 320 rotates around the rotation axis 322 within rotation angles of 0 to 70°, the opening angle of the ear 320 is basically 0. On the other hand, since the cam follower 326 is mounted on the skew cam 328, even when the rotation angle of the ear 320 around the rotation axis 322 is in the range of 0 to 70°, the ear 320 is allowed to open freely within a free motion range of opening angles α of 0 to 28° once the user touches and moves the ear 320 in a direction in which the tip of the ear 320 opens. In other words, when the rotation angle of the ear 320 around the rotation axis 322 is 0 to 70°, the ear 320 is allowed to rotate within a free motion range around the rotation axis 324 serving as a center of rotation in the direction of the arrow A5, owing to the cam follower 326 moving away from the skew cam 328.

When the opening angle α reaches 28 degrees, the ear 320 rotating around the rotation axis 324 serving as a center of rotation hits a predetermined mechanical stopper and can no longer open. When the rotation angle of the ear 320 around the rotation axis 322 is in the range of 0 to 70 degrees, the free motion range corresponds to the range from the state where the cam follower 326 abuts on the skew cam 328 to the state where the cam follower 326 moves away from the skew cam 328 and the ear 320 comes into contact with the above-mentioned mechanical stopper.

On the other hand, as illustrated in FIG. 6B, when the rotation angle around the rotation axis 322 is in the range of 0 to −95 degrees, as the rotation angle is smaller, the cam follower 326 rises along the skew cam 328 and the ear 320 has a greater opening angle α. Therefore, the free motion range in the direction in which the ear 320 opens is smaller. Then, when the rotation angle around the rotation axis 322 reaches −95 degrees, the opening angle of the ear 320 reaches 28 degrees with a free motion range of 0.

As described above, the ear 320 has an opening angle α that varies with the rotation angle of the ear 320 around the rotation axis 322. As a result, the ear 320 can move more realistically and the robot apparatus 1000 can show emotions more expressively. In addition, a free motion range is provided in the direction of opening the ear 320. Therefore, even when the ear 320 is not open, the ear 320 is allowed to open when touched by the user, and thus the ear 320 can move more realistically.

(Configuration of Tail)

Figure 9A:
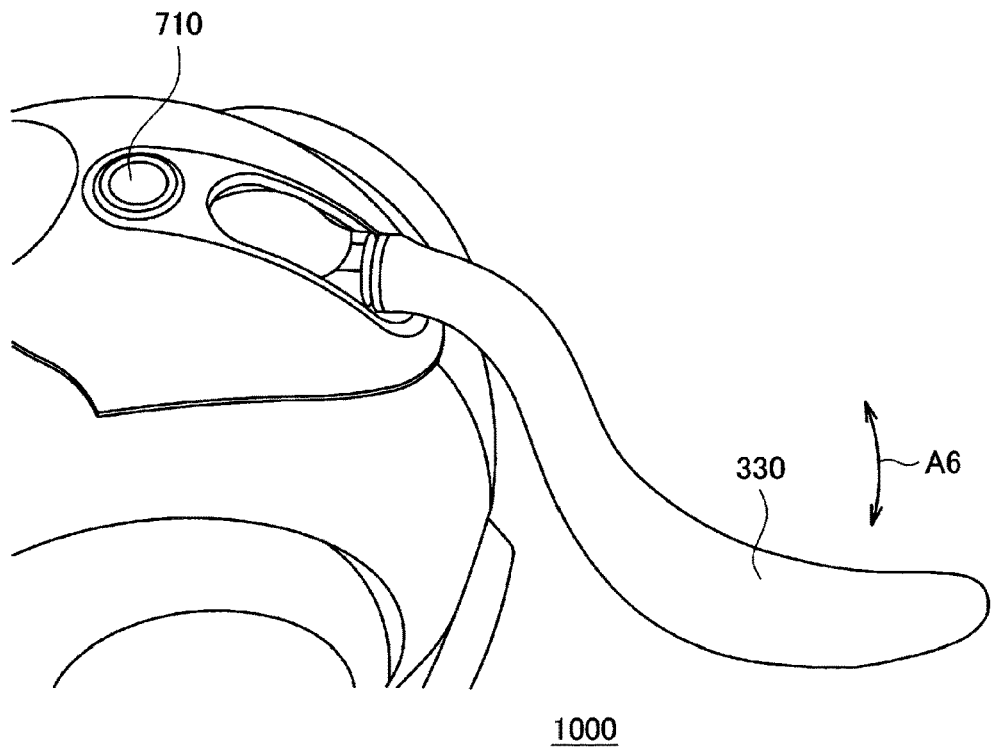
FIG. 9A is a schematic diagram illustrating an appearance of a tail disposed on the robot apparatus according to an embodiment of the present disclosure.
Figure 9B:
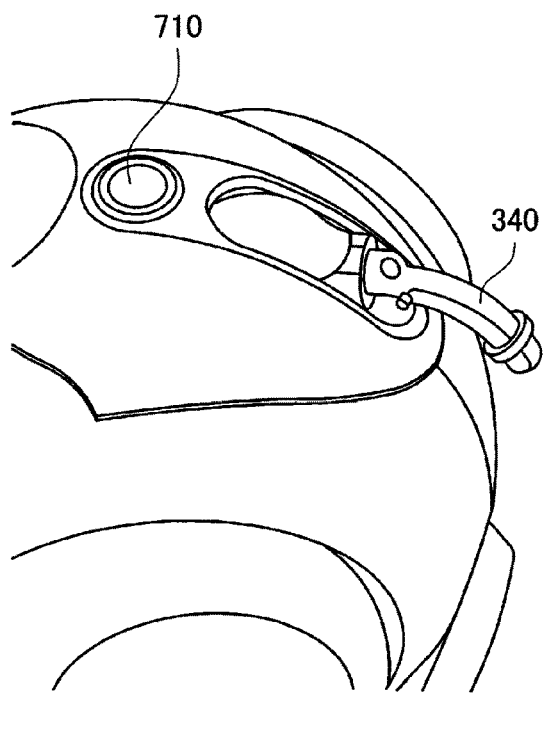
FIG. 9B is a schematic diagram illustrating a state where the tail in FIG. 9A is removed.

FIG. 9A is a schematic diagram illustrating an appearance of a tail 330 disposed on the robot apparatus 1000. In addition. FIG. 9B is a schematic diagram illustrating a state where the tail 330 in FIG. 9A is removed. The tail 330 is attached to a tail attachment 340. The tail attachment 340 is driven by a motor to rotate in the direction of the arrow A6. The tail 330 includes silicone rubber and has a thicker tip than the base. A hole is disposed at the base of the tail 330 for insertion into the tail attachment 340. The tail 330 is solid in a region where the hole for insertion into the tail attachment 340 is not formed. As described above, the tail 330 includes silicone rubber, the tip is made thicker than the base of the tail, and the tail 330 is made solid, and thus the tip is heavier. As a result, when the tail attachment 340 is driven in the direction of the arrow A6, the tail 330 shakes moderately. In addition, the tail 330 also shakes moderately when the robot apparatus 1000 is walking. Because the tail 330 moderately shakes, the user can have a feeling of friendliness and affection for the robot apparatus 1000.

(Configuration of Sensor and Example of Sensor Arrangement)

The robot apparatus 1000 includes various types of sensors. On a back 344 of the robot apparatus 1000 illustrated in FIG. 5, a pressure-sensitive sensor and an electrostatic sensor are disposed over an extended region. The disposed pressure-sensitive sensor is capable of detecting a load of about several tens to several thousands of grams. By disposing the electrostatic sensor together with the pressure-sensitive sensor on the back 344, user operations such as petting or tapping the back 344 can be reliably detected.

In particular, by using the electrostatic sensor and the pressure-sensitive sensor in combination, the occurrence of erroneous detection can be suppressed. For example, when the robot apparatus 1000 is walking, the pressure-sensitive sensor may detect a vibration to erroneously detect the user's hand. In such cases, the reaction of the pressure-sensitive sensor can be ignored as long as the hand is not detected by the electrostatic sensor. When the robot apparatus 1000 remains stationary, the pressure-sensitive sensor is unlikely to erroneously detect anything. Therefore, the user's hand may be detected only on the basis of detection by the pressure-sensitive sensor without using the electrostatic sensor.

Both the pressure-sensitive sensor and the electrostatic sensor disposed on the back of the robot apparatus 1000 are built inside a cover 344a of the back 344. A coating made of silicone rubber is applied to the surface of the cover 344a disposed outside the pressure-sensitive sensor and the electrostatic sensor. The coating is provided with a nesh-like fine pattern. Such configuration can give a "dry pleasant feeling" to the user touching the back, thus improving the tactile feeling. As a result, in interactions between the user and the robot apparatus 1000, the user can be given a tactile feeling that makes the user want to touch the robot apparatus 1000 more often, and emotions of the user are better expressed to the robot apparatus 1000.

Figure 17:
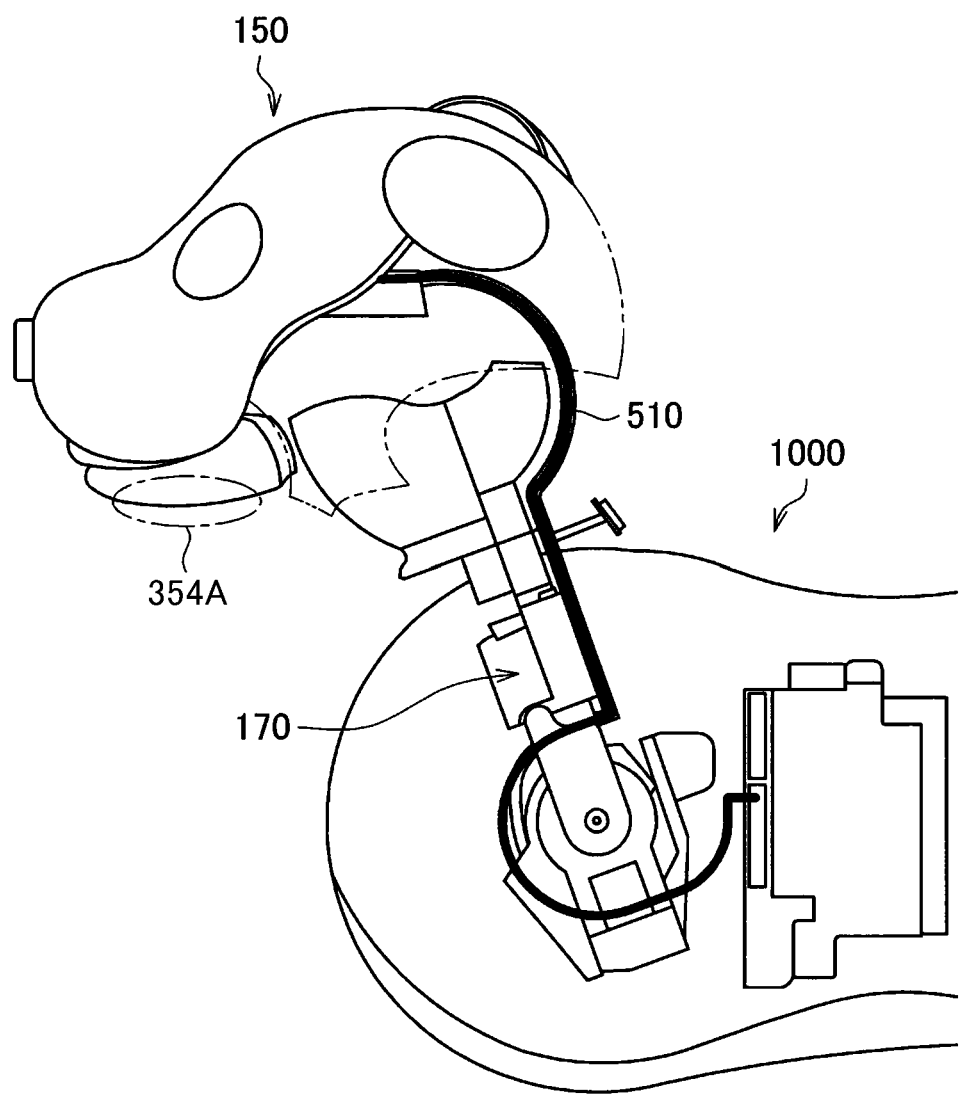
FIG. 17 is a schematic diagram illustrating routing of a circuit board from the body to the head of the robot apparatus according to an embodiment of the present disclosure.

In FIG. 7, an electrostatic sensor is built in a region 352A surrounded by a dashed-dotted line from top of the head to the nose. Furthermore, as shown in FIG. 17, an electrostatic sensor is also built in a region 354A surrounded by a dashed-dotted line on the chin. Therefore, user operations can also be reliably detected when the user pets or taps the region 352A from top of the head to the nose or the region 354A on the chin.

When petted by the user, the robot apparatus 1000 is capable of recognizing the user operation as a reward. Therefore, the robot apparatus 1000 can more often make the motion that the robot apparatus 1000 performed immediately before petted.

As illustrated in FIG. 7, a camera 700 is mounted on the nose of the robot apparatus 1000. In addition, as illustrated in FIGS. 9A and 9B, a camera 710 is also mounted on the back of the robot apparatus 1000 in front of the tail 330. The robot apparatus 1000 can recognize surrounding people and objects by taking images of the surroundings with the cameras 700 and 710.

Furthermore, a human detection sensor and a position sensitive detector (PSD) are disposed near the nose of the robot apparatus 1000. For example, the human detection sensor can detect the temperature of a person up to 5 m ahead. The robot apparatus 1000 can detect the user with these sensors. Moreover, the robot apparatus 1000 includes an illuminance sensor that detects illuminance.

Furthermore, the robot apparatus 1000 includes gyro sensors (acceleration sensors) disposed on the body and head. Therefore, the robot apparatus 1000 can detect its own posture. Moreover, the robot apparatus 1000 can detect its falling and being held and lifted by the user with the gyro sensor.

Microphones are embedded in the head of the robot apparatus 1000 at five positions, and holes corresponding to the positions of the microphones are made in the exterior of the head. Specifically, microphones are built in the head at two positions in each of the left and right regions and the other microphone is built in the back of the head. In general, changes in the position and volume of a sound source can be estimated by acquiring a sound from three microphones.

For example, when a voice is heard from the right side of the robot apparatus 1000, the joint 152, the joint 154, the joint 156, and the joint 158 in the head system are controlled so that the head of the robot apparatus 1000 faces to the right. Embedding the microphones in the head achieves natural movement of the head.

(Configuration of Eye)

Figure 10:
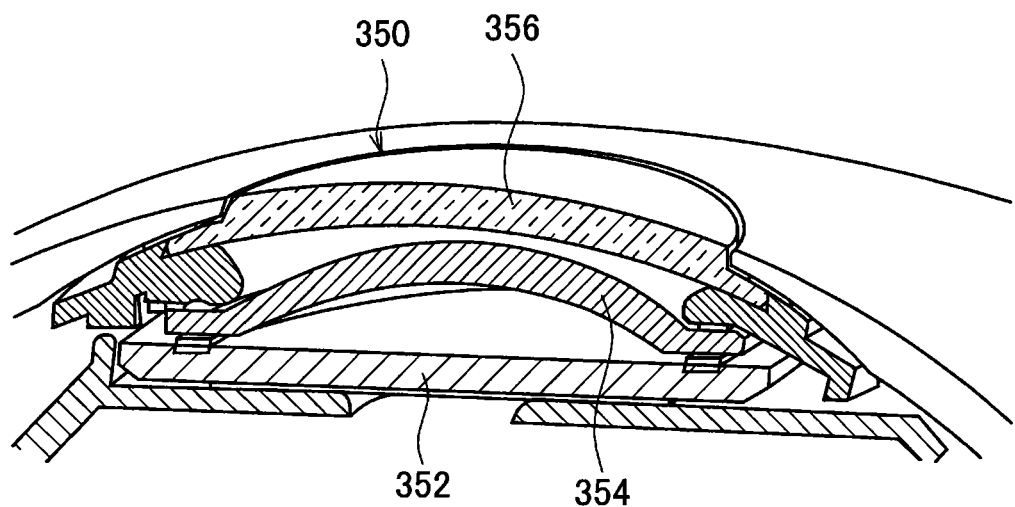
FIG. 10 is a schematic diagram showing a cross section taken along a dashed-dotted line I-I' in FIG. 7.

An eye 350 of the robot apparatus 1000 illustrated in FIG. 7 is configured to make various motions and give various displays in response to motions of the robot apparatus 1000. For this purpose, the robot apparatus 1000 includes a self-light-emitting display device (OLED) 352 in each of the left and right eyes 350. FIG. 10 is a schematic diagram showing a cross section taken along a dashed-dotted line I-I' in FIG. 7. As illustrated in FIG. 10, the eye 350 of the robot apparatus 1000 includes the OLED 352, a lens 354, and a cover glass 356.

The OLED 352, the lens 354, and the cover glass 356 are disposed in each of the left and right eyes 350. Assuming that a common planar display device is disposed for each of the left and right eyes, both eyes are arranged in a planar manner to fail in three-dimensional configuration of the eyes. In the present embodiment, the OLEDs 352 are individually disposed in the left and right eyes 350 respectively, so that the left and right eyes 350 can be arranged to be optimally oriented to achieve three-dimensional configuration of the left and right eyes 350.

The OLED 352 gives displays relating to the eye 350, such as blinking of the eye 350, the white part of the eye, the black part of the eye, and movement of the black part. The lens 354 magnifies the display on the OLED 352 and refracts light so that the display on the OLED 352 is expanded.

The lens 354 has a convex curved surface on the front side, and the display of the OLED 352 is reflected by the curved surface. This represents a spherical eyeball. As illustrated in FIG. 10, the lens 354 is thicker toward the center and thinner toward the edge. As the lens 354 has a varying thickness between the center and the edge, the curvature differs between the front surface and the back surface of the lens 354 so that a lens effect can be generated. In addition, when seen by the user, the eye 350 can provide an expanded display as described above. In addition, if the lens 354 is disposed without any gap so as to fill the front surface of the OLED 352, the lens effect will be too strong. However, providing a space between the lens 354 and the OLED 352 makes it possible to exert suitable lens effects.

Although the display provided by the OLED 352 is planar, the display undergoes coordinate conversion into the curved surface of the lens 354 and the display is given at a desired position of the sphere. Therefore, for example, the black part of the eye can be controlled to be directed to the user by controlling the pitch angle and the yaw angle on the lens 354.

The cover glass 356 includes a transparent resin material having a uniform thickness and the like. The front surface of the cover glass 356 includes a curved surface that is continuous with the surface of the adjacent head portion of the robot apparatus 1000. Therefore, even when the user touches the eye 350 and its surroundings, the user does not recognize an uneven surface, and thus a feeling of strangeness can be prevented.

(Configuration of Cover (Lid))

Figure 11A:
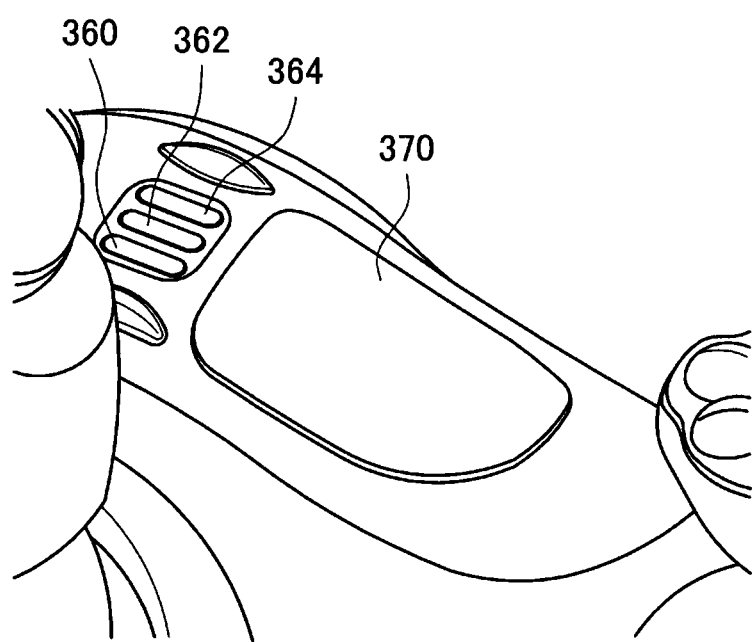
FIG. 11A is a schematic diagram illustrating a belly portion of the robot apparatus according to an embodiment of the present disclosure.
Figure 11B:
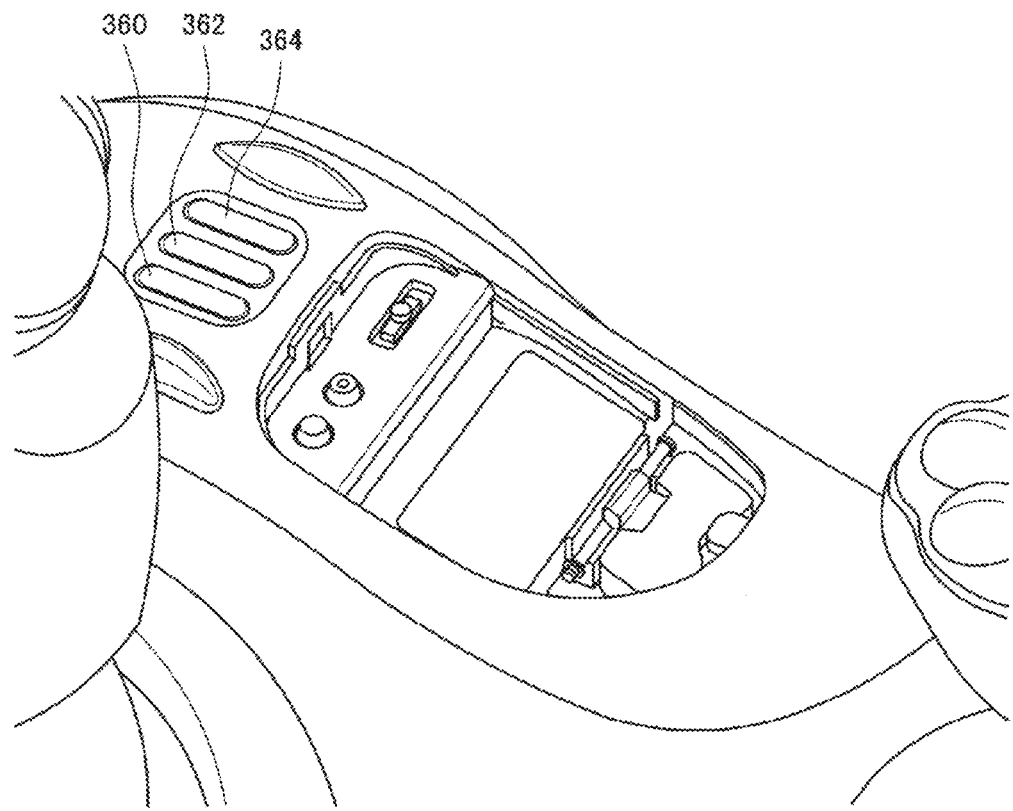
FIG. 11B is a schematic diagram illustrating a state where the cover in FIG. 11A is removed.

FIG. 11A is a schematic diagram illustrating a belly portion of the robot apparatus 1000. Contact terminals 360, 362, and 364 to contact the charging station to receive electric power are disposed on the belly of the robot apparatus 1000. A battery 380, for example, can be stored behind the contact terminals 360, 362, and 364, and the battery 380 is exposed to the outside when the cover 370 is removed. Furthermore, the user can access various terminals and operation keys by removing the cover 370. FIG. 11B is a schematic diagram illustrating a state where the cover 370 in FIG. 11A is removed.

Figure 12A:
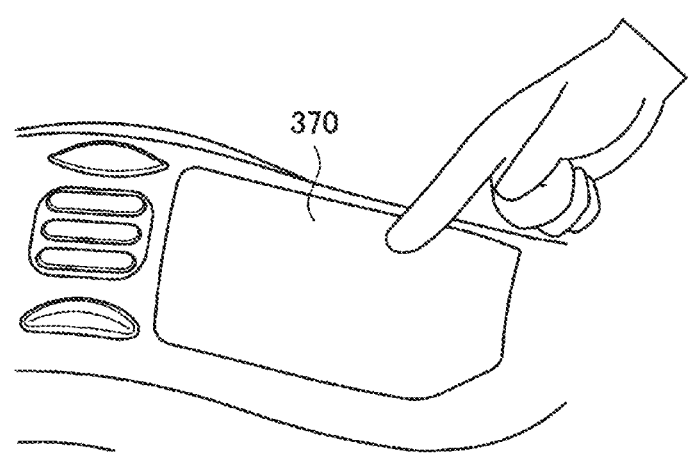
FIG. 12A is a schematic diagram illustrating how the cover in the robot apparatus according to an embodiment of the present disclosure is removed.
Figure 12B:
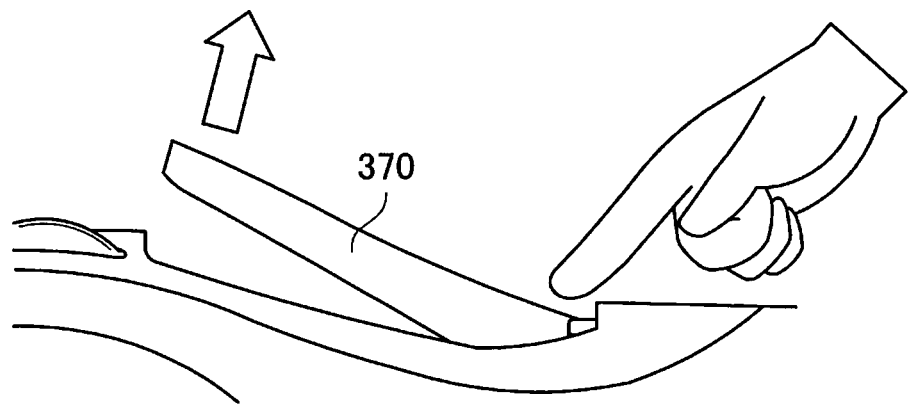
FIG. 12B is a schematic diagram illustrating how the cover in the robot apparatus according to an embodiment of the present disclosure is removed.
Figure 12C:
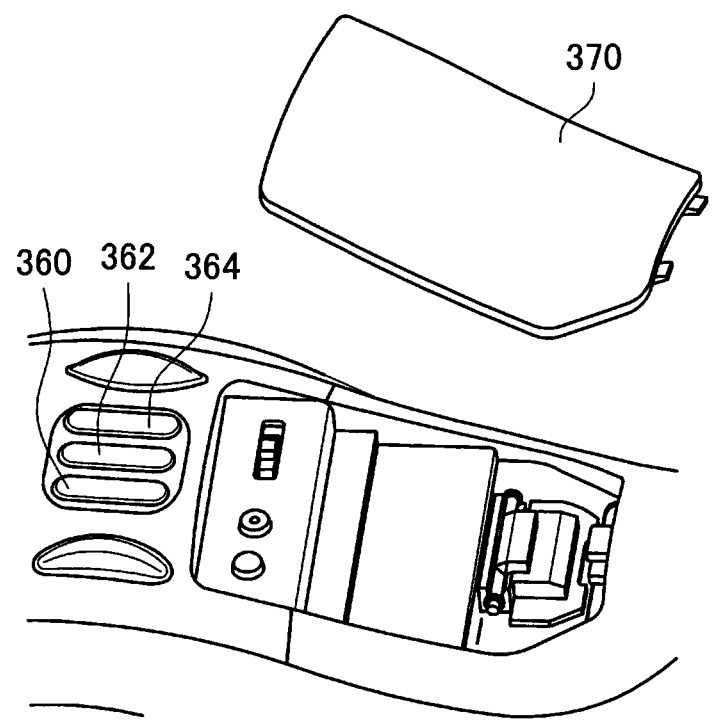
FIG. 12C is a schematic diagram illustrating how the cover in the robot apparatus according to an embodiment of the present disclosure is removed.

FIGS. 12A, 12B, and 12C are schematic diagrams illustrating how the cover 370 is removed. Unlike general electric appliances, the cover 370 does not have a structure in which the cover 370 is scraped and removed by a fingernail. To remove the cover 370, first, the hind-leg side end of the cover 370 is pressed by a finger as illustrated in FIG. 12A. Then, the front-side end of the cover 370 is lifted up as illustrated in FIG. 12B. Thus, as shown in FIG. 12C, the cover 370 can be removed by pulling up the front-side end of the cover 370.

(Configuration of Battery)

FIG. 13 is a schematic diagram illustrating a configuration of a battery 380. As shown in FIG. 13, the battery 380 has a substantially rectangular parallelepiped shape, and two of the six sides of the rectangular parallelepiped are formed of curved surfaces. The battery 380 includes six terminals 380a to be electrically connected to the robot apparatus 1000. Providing the six terminals 380a makes it possible to reliably supply power to the robot apparatus 1000 that may use a larger amount of power.

Furthermore, rectangular recesses 386 and 388 are disposed on the two faces 382 and 364 opposed to each other in the battery 380. The recesses 386 and 308 are disposed on the two faces 352 and 364 at positions opposed to each other. Thus, the recesses 386 and 388 can be held with, for example, an index finger and a thumb, so that the battery 380 can be easily attached to and detached from the robot apparatus 1000.

Furthermore, a recess 390 is formed on a face 305 of the battery to provide an upright wall 392. This makes it possible to remove the battery 360 from the robot apparatus 1000 by placing a finger on the upright wall 392.

A positioning recess 394 is formed at the tip of the six terminals 380a. The positioning recess 394 is opened in the direction along which the six terminals 380a each are to be connected to connection terminals on the robot apparatus 1000. The positioning recess 394 includes positioning recess forming portions 396 and 398. At least part of the positioning recesses forming portions 396 and 398 is formed into a sloped surface so that the opening area of the positioning recess 394 increases as the positioning recess 394 is away from the terminals 380a in the direction in which the positioning recess 394 is opened. Note that the housing of the battery 380 is formed by, for example, vertically connecting an upper case and a lower case. There are placed a plurality of cells, a separator for separating and arranging the cells, a connection metal plate connected to the cells, a circuit board, and others in the storage space of the housing. A basic configuration of the battery 380 can be established in a similar manner to the battery described in Japanese Patent No. 6191795, for example.

(Configuration of Frame, Board, and Wiring)

Figure 14:
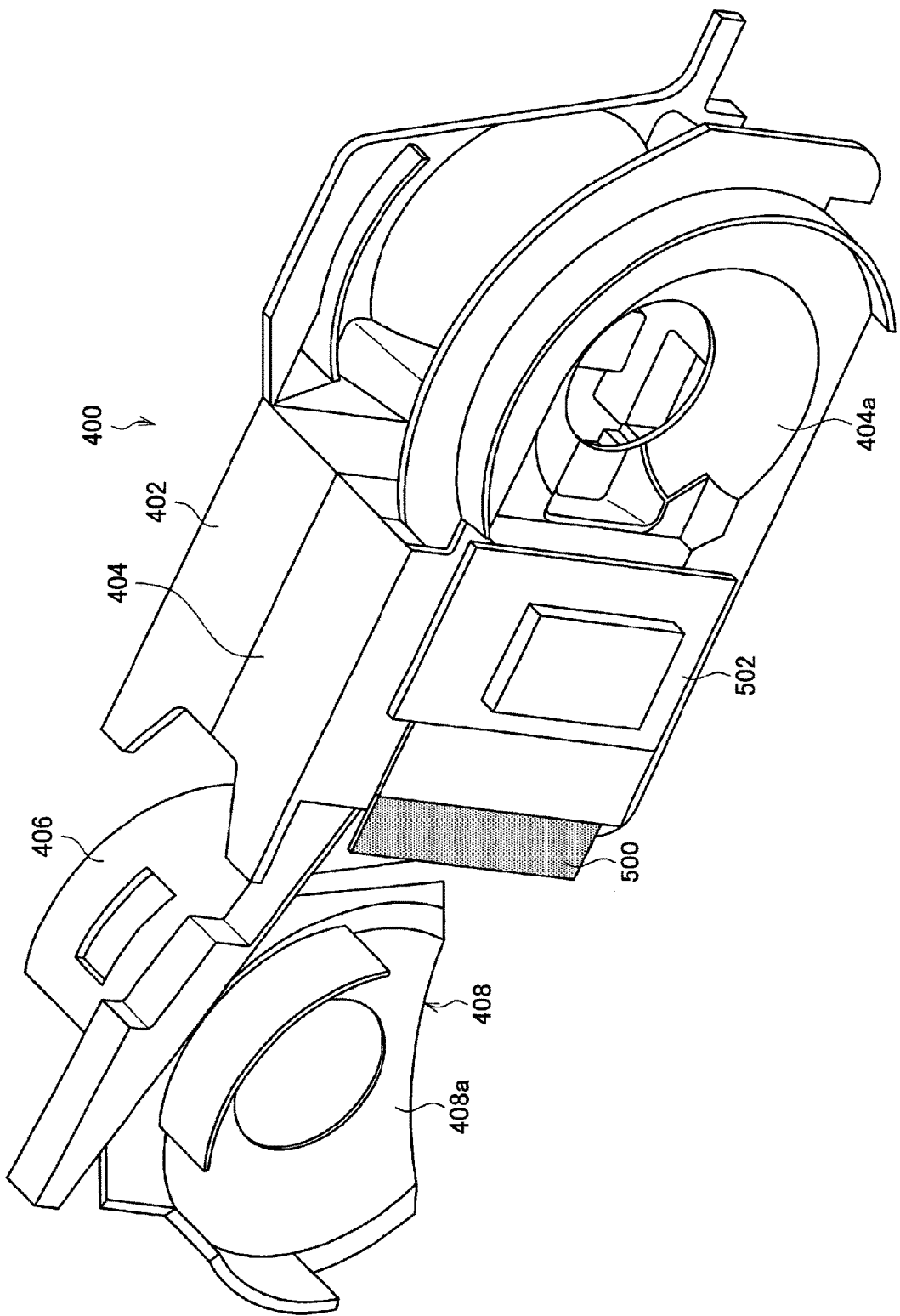
FIG. 14 is a schematic diagram illustrating a frame and an arrangement of boards for the robot apparatus according to an embodiment of the present disclosure.
Figure 15:
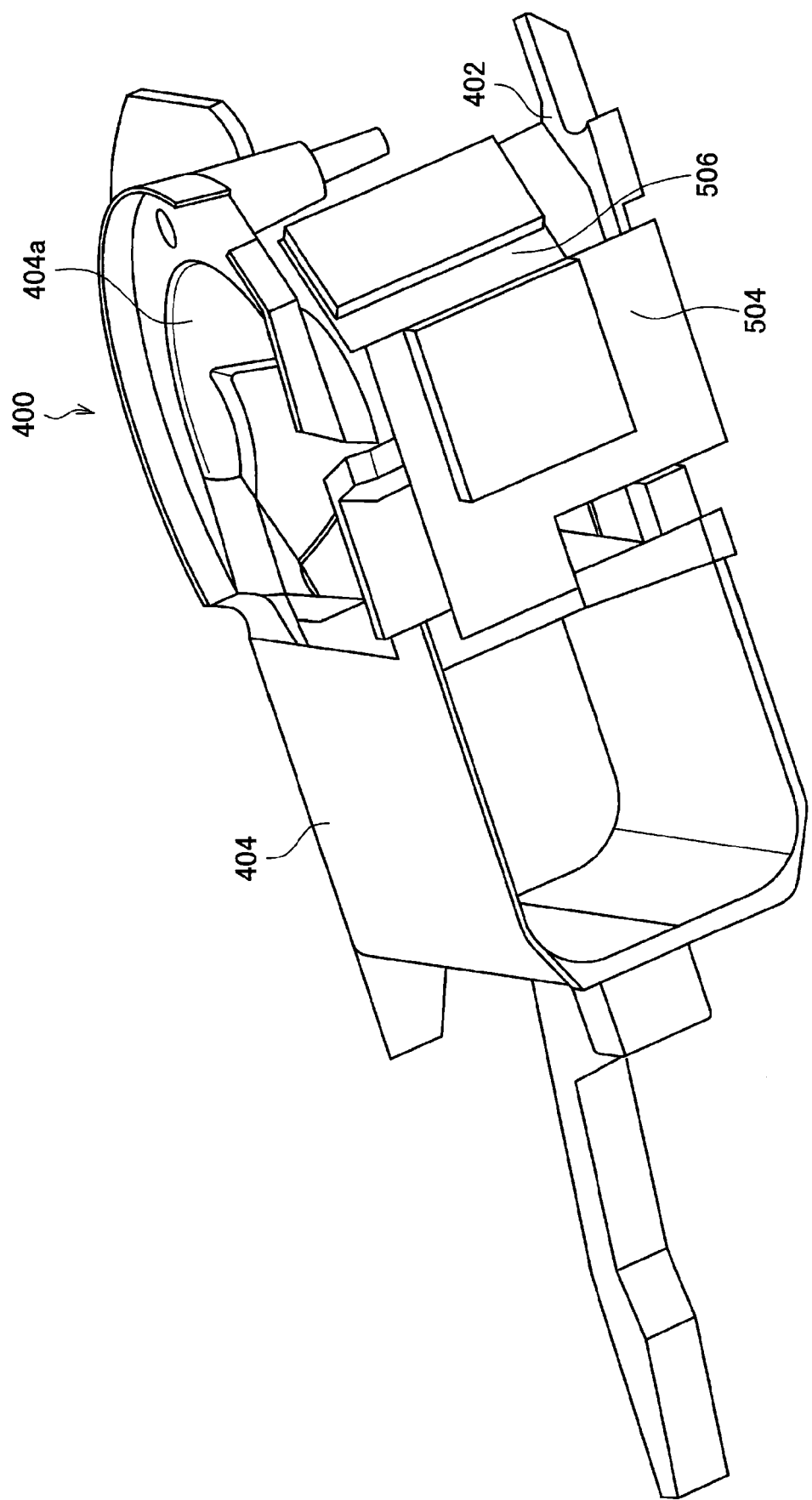
FIG. 15 is a schematic diagram illustrating a frame and an arrangement of boards for the robot apparatus according to an embodiment of the present disclosure.
Figure 16:
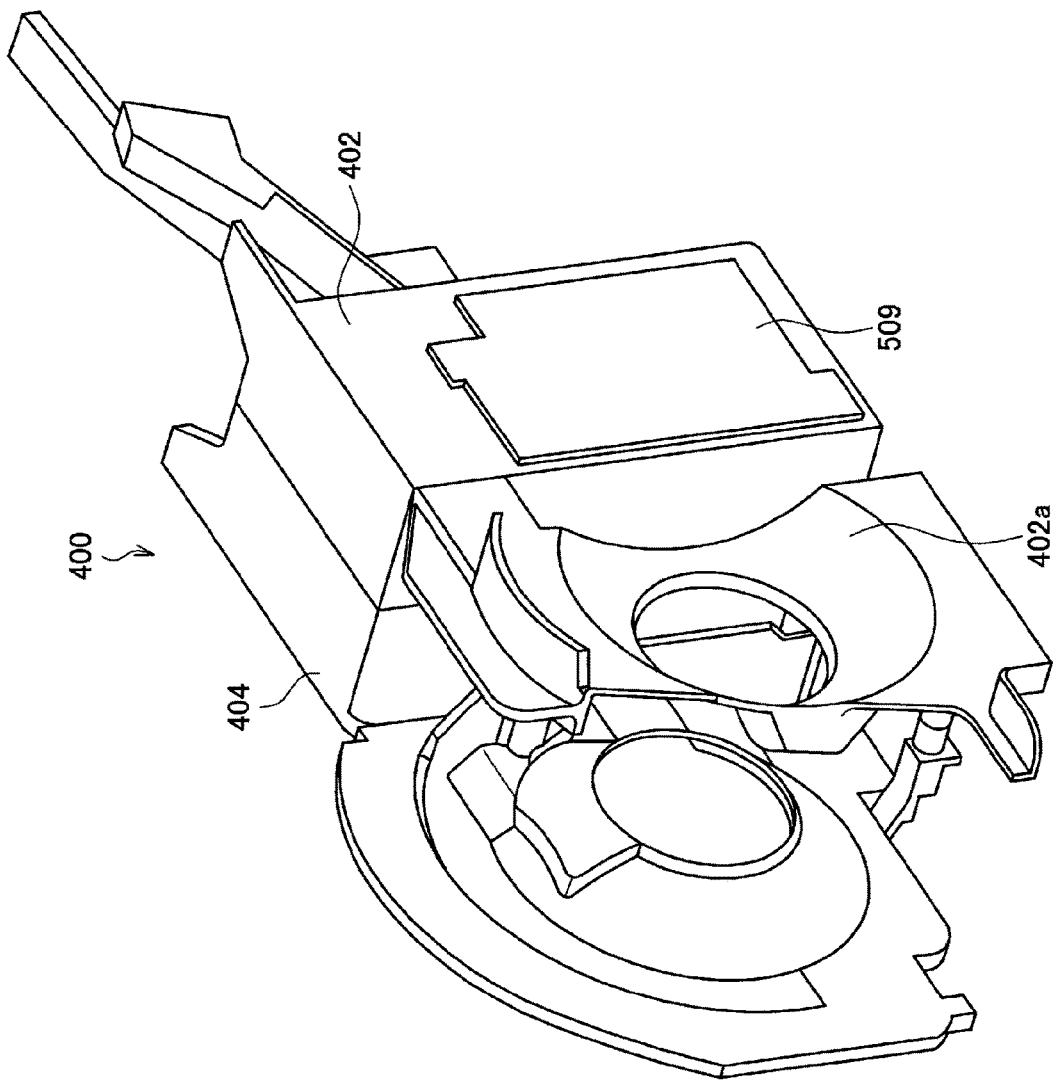
FIG. 16 is a schematic diagram illustrating a frame and an arrangement of boards for the robot apparatus according to an embodiment of the present disclosure.

FIGS. 14 to 16 are schematic diagrams illustrating a frame 400 of the robot apparatus 1000 and an arrangement of a circuit board 500. As an example, the frame 400 includes a magnesium die casting, mainly including four parts 402, 404, 406, and 408. FIGS. 14 to 16 illustrate the same frame 400 viewed from different directions, but illustration of the parts 406 and 408 is omitted in FIGS. 15 and 16.

Recessed regions 402a and 404a are formed in the parts 402 and 404, respectively, and the joints 112 and 114 of the left foreleg and the joints 102 and 104 of the right foreleg are connected to the regions 402a and 404a, respectively. Furthermore, a recess portion 408a is disposed in the part 408, and the joints 122 and 124 of the right hind leg 120 are connected to the recess portion 408a. As with the part 408, the part 406 includes a recess portion to which the joints 132 and 134 of the left hind leg 130 are connected. The parts 406 and 408 rotate with respect to the parts 402 and 404 around a vertical rotation axis serving as a center of rotation, driven by the driving force of the rotor for the joint 142. Therefore, the robot apparatus 1000 can perform a motion of swinging the hips left and right when viewed from above, as described above.

Since the frame 400 includes a magnesium die casting, the rigidity of the robot apparatus 1000 can be further enhanced as compared with the case where the frame 400 includes a metal sheet.

As illustrated in FIGS. 14 to 16, circuit boards 500, 502, 504, 506, 508, and 509 are arranged on the frame 400. By arranging the circuit boards 500, 502, 504, 506, 508, and 509 in a distributed manner on the frame 400, heat dissipation effects can be improved.

In addition, in general, the frame of the robot apparatus 1000 often includes a box-shaped housing, but in the present embodiment, the frame includes not a box-shaped housing but magnesium die-cast parts 402, 404, 406, and 408. Therefore, the flexibility in arranging the circuit boards 500, 502, 504, 506, 506, and 509 can be greatly enhanced.

Figure 18:
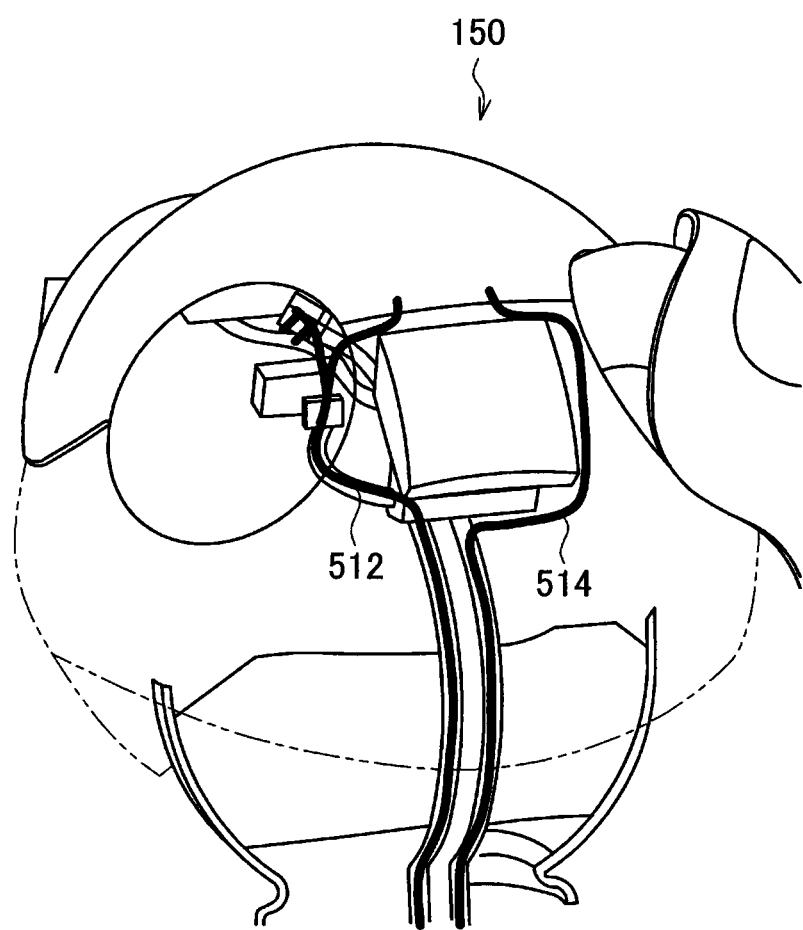
FIG. 18 is a schematic diagram illustrating routing of a circuit board from the body to the head of the robot apparatus according to an embodiment of the present disclosure.

In addition, FIGS. 17 and 18 are schematic diagrams illustrating routing of a circuit board 510 from the body to the head of the robot apparatus 1000. As illustrated in FIG. 17, the circuit board 510 connecting the body 140 and the head 150 of the robot apparatus 1000 is disposed along an arm 170 that connects the joint 156 and the joint 158. Since the head 150 moves relative to the body 140, the circuit board 510 desirably includes a flexible printed circuit (FPC). As illustrated in FIG. 18, the circuit board 510 is separated into two circuit boards 512 and 514 to be connected to another circuit board disposed in the head 150.

The main circuit board for the robot apparatus 1000 is disposed on the body side. On the other hand, the circuit board 510, which includes a relatively large number of wirings, is used for the head 150, where various types of sensors, eye display devices, and others are intensively disposed.

(Configuration for Hiding Screws)

The individual screws that were used for assembling the robot apparatus 1000 are all hidden so as not to be exposed to the outside. For this purpose, all the screws are placed inside the cover of the exterior. FIG. 19 is a schematic diagram illustrating a screw 600 and a cover 610 to cover the screw 600. The screw 600 and the cover 610 appear when any cover of the exterior is removed. The cover 610 illustrated in FIG. 19 has a function of hiding the screw 600 and preventing the screw 600 from loosening.

As illustrated in FIG. 19, a jagged portion 602 is formed on a side of the head of the screw 600. The cover 610 includes a hole 612 into which the head of the screw 600 is to be inserted. On the inner periphery of the hole 612, there is disposed a jagged portion 614 corresponding to the jagged portion 602 on the outer periphery of the screw 600.

Furthermore, a recess portion 620 is formed on the exterior around the screw 600. On the cover 610, a protrusion 616 corresponding to the recess portion 620 is disposed. Therefore, when the cover 610 is put on the screw 600, the jagged portion 614 of the cover 610 is fitted to the jagged portion 602 of the head of the screw 600 and, at the same time, the protrusion 616 of the cover 610 is fitted into the recess portion 620 of the exterior. As a result, the screw 600 can be prevented from loosening.

[Example Configuration of System to which Robot Apparatus is Applied]

Figure 20:
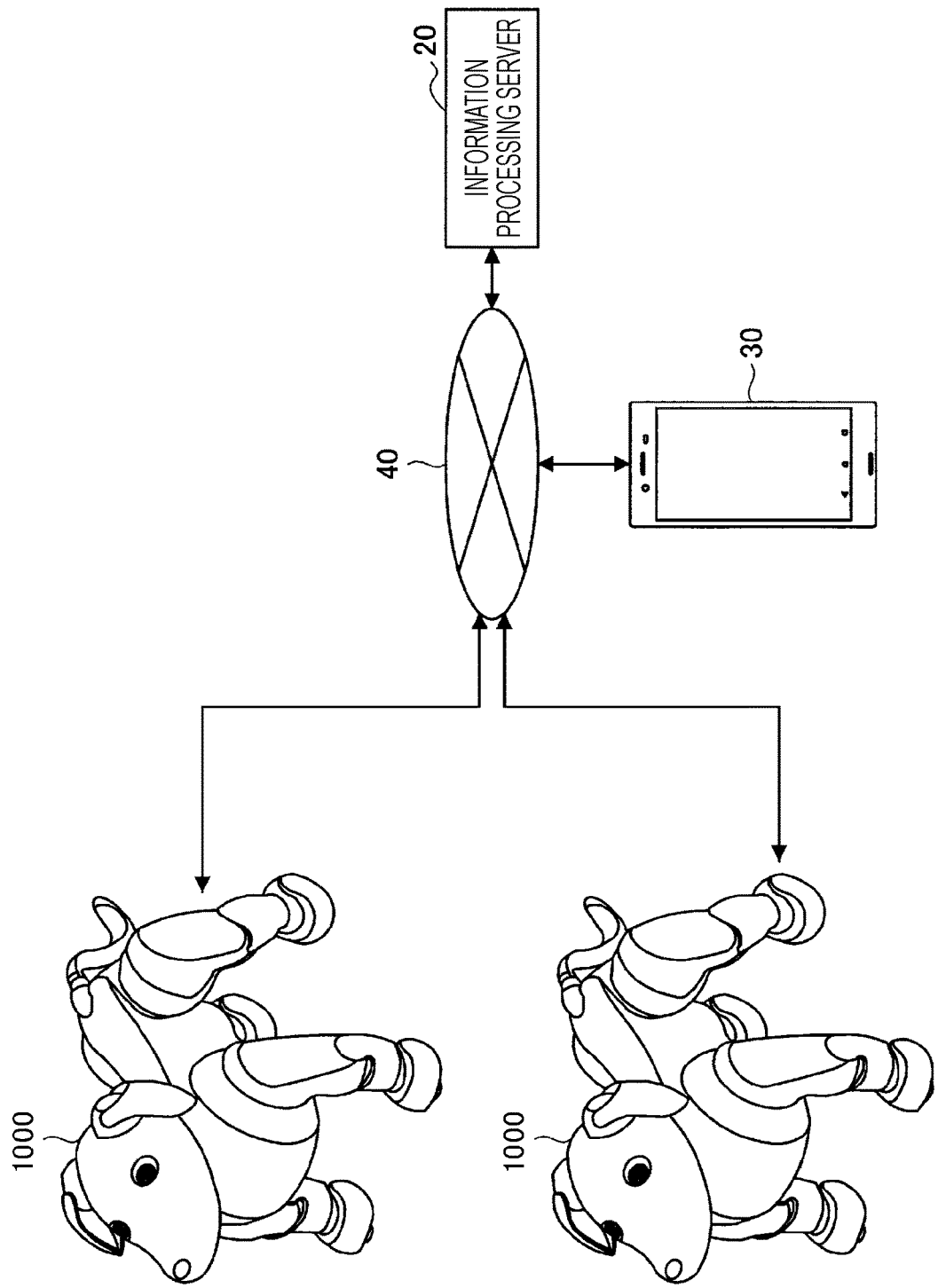
FIG. 20 is a diagram illustrating an example of a system configuration according to an embodiment of the present disclosure.

The following describes an example configuration of a system to which the above-described robot apparatus 1000 is applied. FIG. 20 is a diagram illustrating an example of a system configuration according to an embodiment of the present disclosure. With reference to FIG. 20, an information processing system according to an embodiment of the present disclosure includes a plurality of robot apparatuses 1000, an information processing server 20, and an information processing terminal 30. Note that individual components included in the information processing system are connected via a network 40 to be able to communicate with one another.

(Robot Apparatus 1000)

The robot apparatus 1000 according to an embodiment of the present disclosure is an information processing device that estimates the situation on the basis of collected sensor information, and autonomously selects and performs any of various motions in accordance with the situation. As described above, the robot apparatus 1000 according to an embodiment of the present disclosure is an autonomous moving robot that is shaped like, for example, a human being or an animal such as a dog and is capable of making motions.

(Information Processing Server 20)

An information processing server 20 according to an embodiment of the present disclosure is an information processing device that is connected to a plurality of robot apparatuses 1000 and has a function of collecting various types of information from each robot apparatus 1000. The information processing server 20 can, for example, analyze the state of the hardware for the robot apparatus 1000 and the degree of the user's enthusiasm for the robot apparatus 1000, on the basis of sensor information collected by the robot apparatus 1000. In addition, the information processing server 20 stores motion correction information for correcting motions (operations) preset in the robot apparatus 1000. The motion correction information is, for example, the information to be used in a case where a sole pad, which is an example of the soundproofing device, is disposed on the underside of a foot of the robot apparatus 1000. Note that the sole pad and the motion correction information will be described later in detail.

Furthermore, the information processing server 20 has a function of presenting, on the basis of the situation estimated by the robot apparatus 1000, a recommended action to be performed by the robot apparatus 1000 in the situation. For this purpose, the information processing server 20 may transmit control sequence data for causing the robot apparatus 1000 to perform the recommended action to the robot apparatus 1000.

Furthermore, the information processing server 20 according to an embodiment of the present disclosure controls operations of an application relating to communications between the robot apparatus 1000 and the user. For example, on the application, the information processing server 20 may dynamically perform control relating to output representation of an avatar that reflects the state of the robot apparatus 1000. In addition, the information processing server 20 has a function of causing the robot apparatus 1000 to reflect a user operation onto the avatar. Owing to the above-described functions of the information processing server 20, communications between the robot apparatus 1000 and the user can be achieved without regard to the locations of the robot apparatus 1000 and the user.

(Information Processing Terminal 30)

The information processing terminal 30 according to an embodiment of the present disclosure is an information processing device that provides a user interface relating to the above-described application to the user. The information processing terminal 30 according to an embodiment of the present disclosure may be, for example, a mobile phone, a smartphone, a tablet, any of various wearable devices, a general-purpose computer, or the like possessed by the user.

(Network 40)

The network 40 has a function of connecting the individual components included in the information processing system. The network 40 may include a public line network such as the Internet, a telephone line network, or a satellite communication network, any of various local area networks (LANs) including Ethernet (registered trademark) or wide area networks (WANs), and the like. Furthermore, the network 40 may include a private line network such as an Internet Protocol-Virtual Private Network (IP-VPN). Furthermore, the network 40 may include a wireless communication network such as Wi-Fi (registered trademark) or Bluetooth (registered trademark).

An example system configuration according to an embodiment of the present disclosure has been described above. Note that the configuration described above with reference to FIG. 20 is merely an example, and the configuration of the information processing system according to an embodiment of the present disclosure is not limited to such example. For example, the robot apparatus 1000 may further perform information communication with various external devices in addition to the information processing server 20. Examples of the aforementioned external devices may include a server that transmits weather, news, and other service information, various information processing terminals owned by the user, home electric appliances, and the like. The system configuration according to an embodiment of the present disclosure may be flexibly modified in accordance with specifications and operations.

(Example Functional Configuration of Robot Apparatus 1000)

Figure 21:
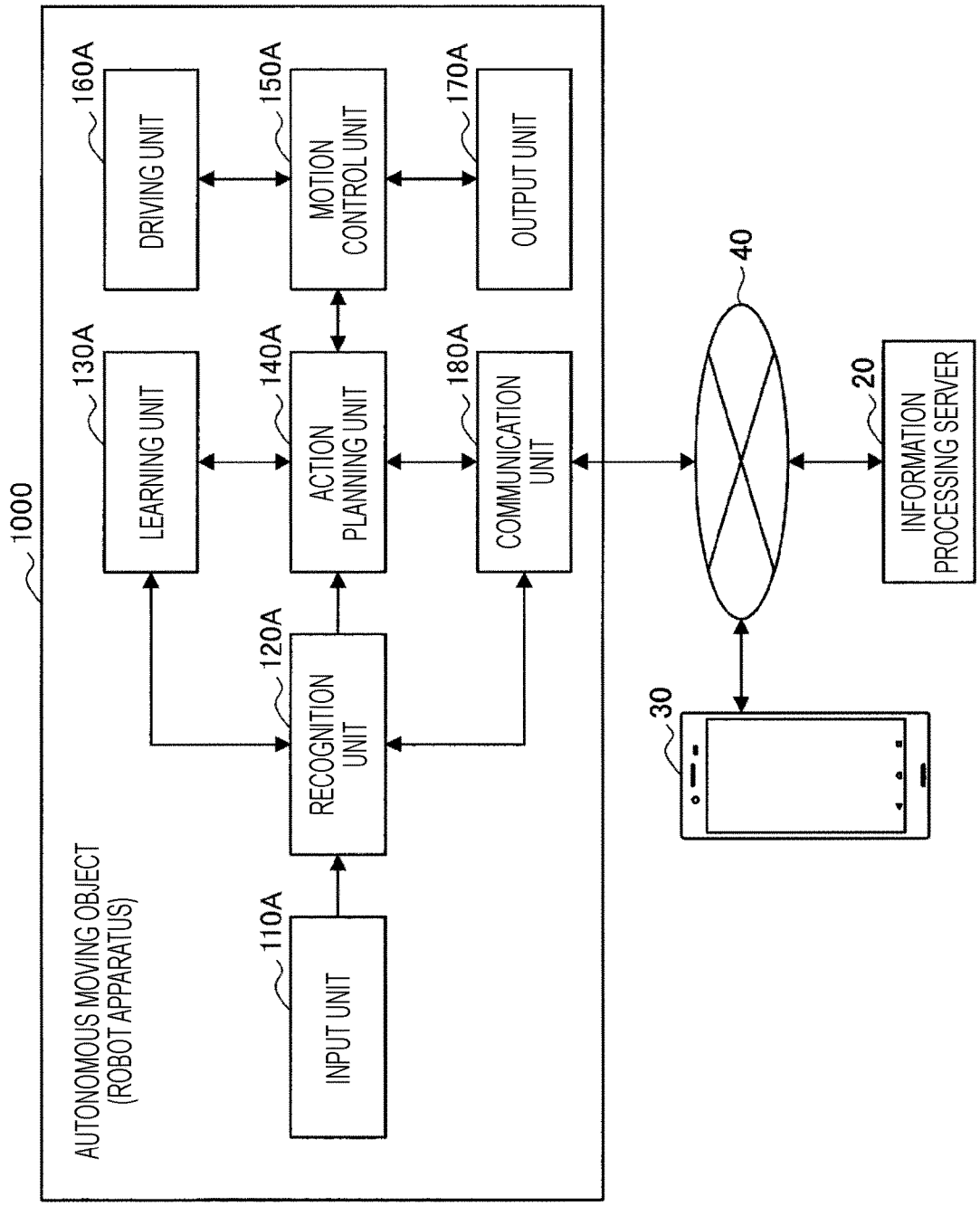
FIG. 21 is a diagram illustrating an example functional configuration of the robot apparatus according to an embodiment of the present disclosure.

The following describes an example functional configuration of the robot apparatus 1000 according to an embodiment of the present disclosure. FIG. 21 is a diagram illustrating an example functional configuration of the robot apparatus 1000 according to an embodiment of the present disclosure. With reference to FIG. 21, the robot apparatus 1000 according to an embodiment of the present disclosure includes an input unit 110A, a recognition unit 120A, a learning unit 130A, an action planning unit 140A, a motion control unit 150A, a driving unit 160A, an output unit 170A, and a communication unit 180A.

The input unit 110A has a function of collecting various types of information relating to the user and the surrounding environment. The input unit 110A collects, for example, utterances of the user and environmental sounds produced around the user, image information relating to the user and the surrounding environment, and various types of sensor information. For this purpose, the input unit 110A includes various sensors.

The recognition unit 120A has a function of performing various types of recognition relating to the user, the surrounding environment, and the state of the robot apparatus 1000, on the basis of various types of information collected by the input unit 110A. For example, the recognition unit 120A may identify persons and perform recognition of facial expressions, lines of sight, objects, colors, shapes, markers, obstacles, stepped surfaces, brightness, and the like.

Furthermore, regarding voices of the user, the recognition unit 120A recognizes emotions, understands words, determines locations of sound sources, and so on. In addition, the recognition unit 120A is capable of recognizing contact made by the user and others, the surrounding temperature, the presence of a moving object, the posture of the robot apparatus 1000, and so on.

Furthermore, the recognition unit 120A has a function of estimating and understanding the surrounding environment and situation where the robot apparatus 1000 is present, on the basis of the aforementioned recognized information. For this purpose, the recognition unit 120A may estimate the overall situation using the environmental knowledge that was stored in advance.

The learning unit 130A has a function of learning the environment (situation) and actions, and the effect of the actions on the environment. The learning unit 130A achieves the aforementioned learning using a machine learning algorithm such as deep learning, for example. Note that the learning algorithm employed by the learning unit 130A is not limited to the above example but can be designed as appropriate.

The action planning unit 140A has a function of planning an action to be performed by the robot apparatus 1000 on the basis of the situation estimated by the recognition unit 120A and the knowledge learned by the learning unit 130A.

The motion control unit 150A has a function of controlling operations of the driving unit 160A and the output unit 170A on the basis of the action plan made by the action planning unit 140A. The motion control unit 150A controls, for example, rotation of the actuator included in each joint, displays provided by a display device, audio output produced by a speaker, and the like, on the basis of the above-described action plan. Furthermore, the motion control unit 150A corrects (adjusts) a motion of the robot apparatus 1000 on the basis of the motion correction information.

The driving unit 160A has a function of bending and extending a plurality of joints included in the robot apparatus 1000 on the basis of the control exerted by the motion control unit 150A. More specifically, the driving unit 160A drives the actuator included in each joint on the basis of the control exerted by the motion control unit 150A.

The output unit 170A has a function of outputting visual information and sound information on the basis of the control exerted by the motion control unit 150A. For this purpose, the output unit 170A includes a display and a speaker.

The communication unit 160A has a function of performing information communication with the information processing server 20, the information processing terminal 30, and another robot apparatus 1000. For example, the communication unit 180A transmits the information relating to the situation and the like recognized by the recognition unit 120A to the information processing server 20. Furthermore, for example, the communication unit 180A receives, from the information processing server 20, a recommended action, control sequence data relating to the recommended action, and data corresponding to a reward.

The foregoing has described an example functional configuration of the robot apparatus 1000 according to an embodiment of the present disclosure. Note that the configuration described above with reference to FIG. 21 is merely an example, and the functional configuration of the robot apparatus 1000 according to an embodiment of the present disclosure is not limited to such example. The functional configuration of the robot apparatus 1000 according to an embodiment of the present disclosure may be flexibly modified in accordance with specifications and operations.

(Example Functional Configuration of Information Processing Server 20)

Figure 22:
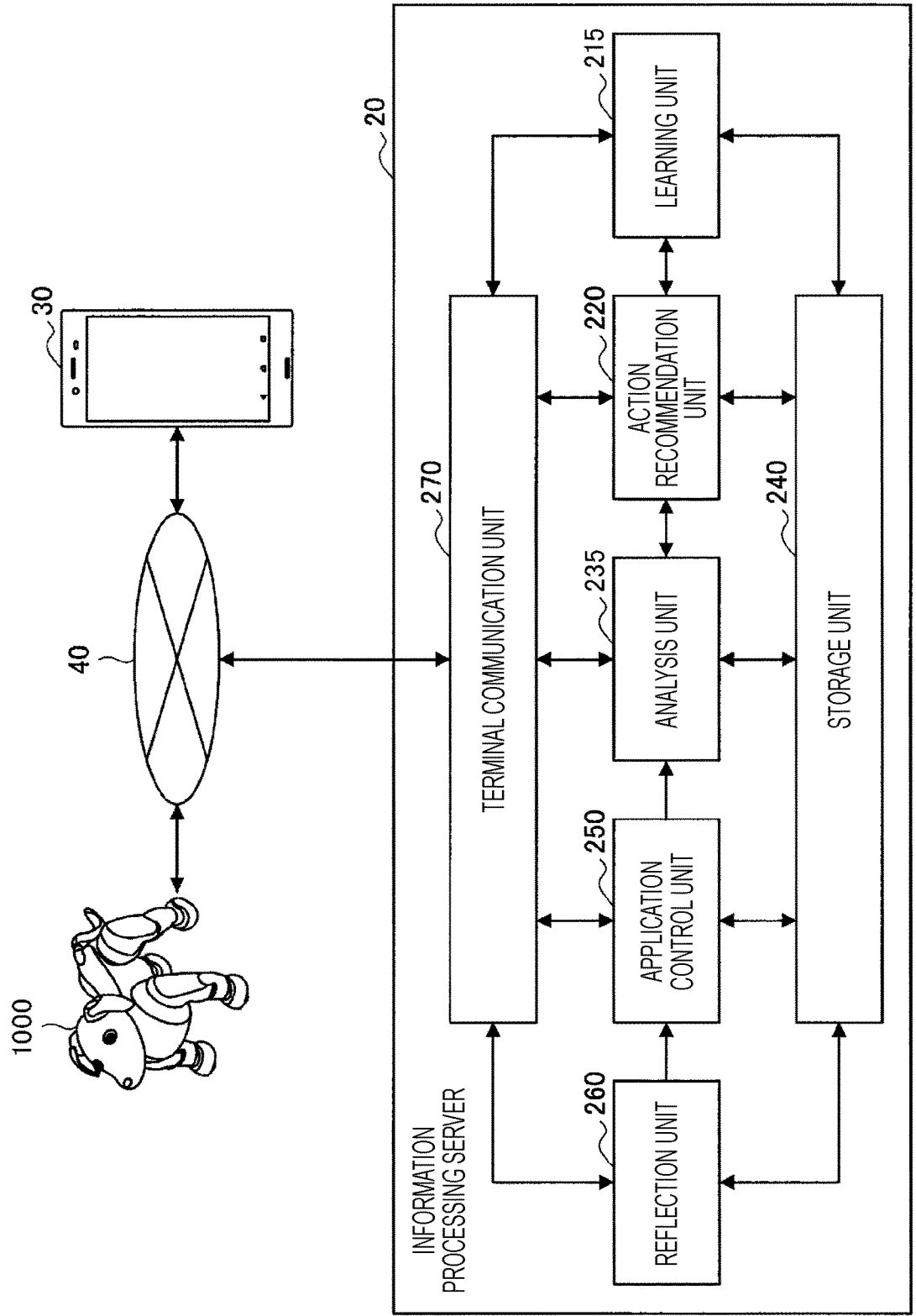
FIG. 22 is a diagram illustrating an example functional configuration of an information processing server according to an embodiment of the present disclosure.

The following describes an example functional configuration of the information processing server 20 according to an embodiment of the present disclosure. FIG. 22 is a diagram illustrating an example functional configuration of the information processing server 20 according to an embodiment of the present disclosure. With reference to FIG. 22, the information processing server 20 according to an embodiment of the present disclosure includes a learning unit 215, an action recommendation unit 220, an analysis unit 235, a storage unit 240, an application control unit 250, a reflection unit 260, and a terminal communication unit 270.

The learning unit 215 has a function of learning the environment (situation) and actions, and the effect of the actions on the environment. A characteristic of the learning is that the learning unit 215 performs the learning on the basis of action histories collected from a plurality of robot apparatuses 1000. That is, the learning unit 215 can be described as collective intelligence shared by the plurality of robot apparatuses 1000.

The action recommendation unit 220 has a function of determining a recommended action to be recommended for the robot apparatus 1000 on the basis of the information relating to the estimated situation received from the robot apparatus 1000 and the knowledge possessed by the learning unit 215 as collective intelligence. In addition, one of the characteristics of the action recommendation unit 220 is transmitting the recommend action along with control sequence data for causing the robot apparatus 1000 to implement the recommended action to the robot apparatus via the terminal communication unit 270.

Here, the aforementioned control sequence data refers to information including control signals relating to time-series changes in the rotation position of a joint included in the robot apparatus 1000, eyeball expressions, and sound output. That is, the control sequence data can be described as settings data for causing the robot apparatus 1000 to perform an action.

Owing to the aforementioned function of the action recommendation unit 220 according to an embodiment of the present disclosure, a new action that can be performed by the robot apparatus 1000 can be added at any time, making it possible to keep the user interested in the robot apparatus 1000, for example.

The analysis unit 235 has a function of conducting various analyses on the basis of the information received from the robot apparatus 1000. For example, the analysis unit 235 is capable of analyzing the state of an actuator 570 and others, on the basis of the action histories and the operation status received from the robot apparatus 1000. Furthermore, the analysis unit 235 is capable of analyzing the user's interest (degree of enthusiasm) in the robot apparatus 1000 and the like on the basis of the information regarding, for example, contact or reaction of the user as received from the robot apparatus 1000.

The storage unit 240 has a function of storing the information to be used by the individual components of the information processing server 20. The storage unit 240 stores, for example, the control sequence data received from the robot apparatus 1000 in such a way that the data is associated with the situation and the user reaction. In addition, the storage unit 240 stores the information to be used by the analysis unit 235 for analysis and also stores the analysis result. Furthermore, the storage unit 240 stores various types of data relating to the application and rewards. Furthermore, the storage unit 240 stores the motion correction information for correcting motions of the robot apparatus 1000.

The application control unit 250 controls operations of an application relating to communications between the robot apparatus 1000 and the user. For example, the application control unit 250 controls motions and output representation of the avatar imitating the robot apparatus 1000 on the application. At this time, the application control unit 250 may perform output control that reflects the current motion and feelings of the robot apparatus 1000.

The reflection unit 260 has a function of causing the robot apparatus 1000 to reflect user operations on the application. For example, on the basis of a user operation, the reflection unit 260 is capable of causing the robot apparatus 1000 to reflect the reward obtained by the avatar.

The terminal communication unit 270 has a function of performing information communication with a plurality of robot apparatuses 1000 via the network 40. For example, the terminal communication unit 270 receives the information relating to the estimated situation from the robot apparatus 1000. In addition, the terminal communication unit 270 transmits, for example, the information relating to the recommended action determined by the action recommendation unit 220 and the control sequence data to the robot apparatus 1000.

Furthermore, on the basis of the control exerted by the reflection unit 260, the terminal communication unit 270 transmits, to the robot apparatus 1000, various control signals for causing the robot apparatus 1000 to reflect the settings made by the user on the application or the reward obtained by the avatar.

The foregoing has described an example functional configuration of the information processing server 20 according to an embodiment of the present disclosure. Mote that the configuration described above with reference to FIG. 22 is merely an example, and the functional configuration of the information processing server 20 according to an embodiment of the present disclosure is not limited to such example. For example, various functions of the information processing server 20 can be implemented on a plurality of devices in a distributed manner. The functional configuration of the information processing server 20 according to an embodiment of the present disclosure may be flexibly modified in accordance with specifications and operations.

(Example Functional Configuration of Information Processing Terminal 30)

Figure 23:
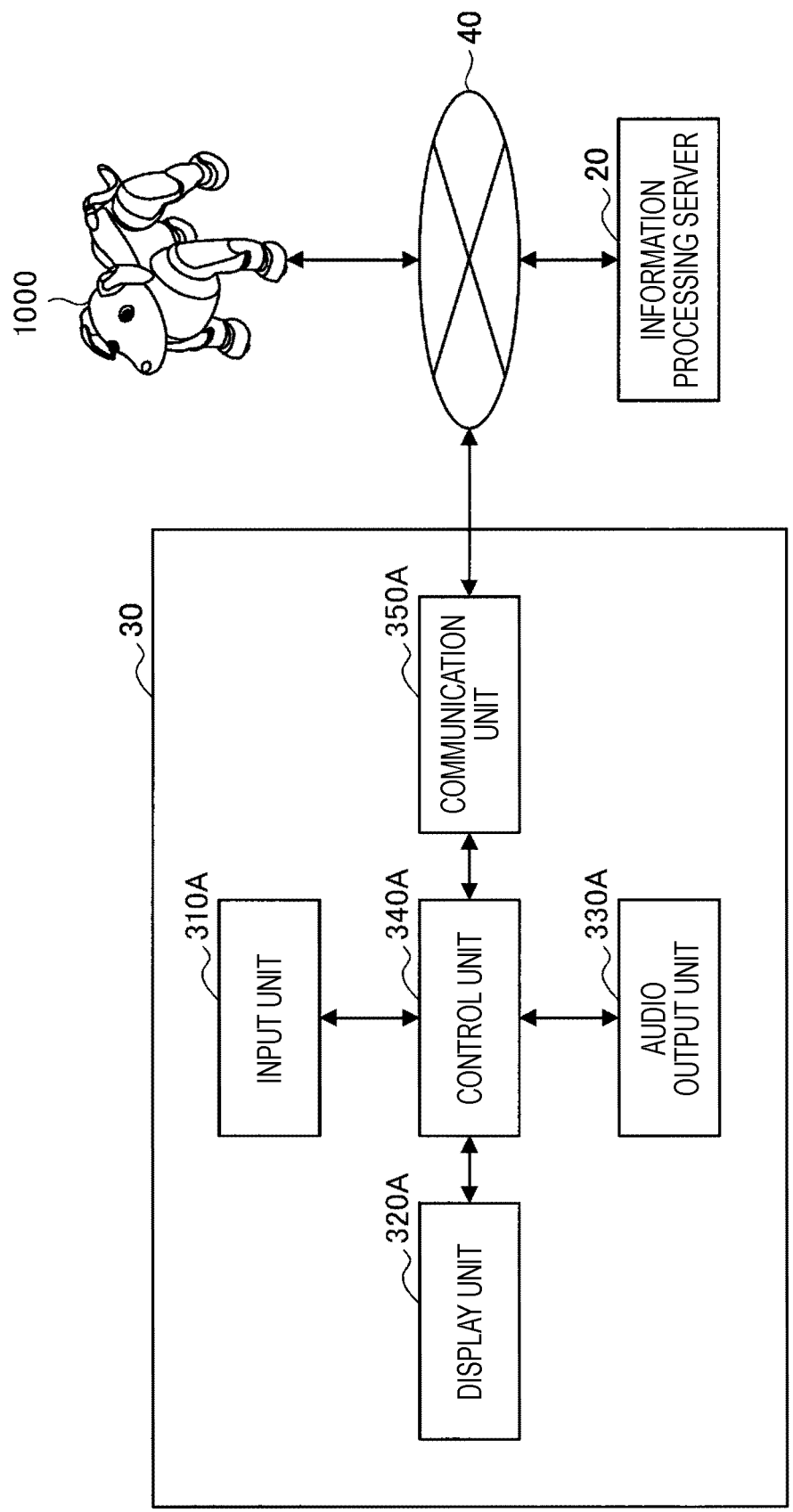
FIG. 23 is a diagram illustrating an example functional configuration of an information processing terminal according to an embodiment of the present disclosure.

The following describes an example functional configuration of the information processing terminal 30 according to an embodiment of the present disclosure. FIG. 23 is a diagram illustrating an example functional configuration of the information processing terminal 30 according to an embodiment of the present disclosure. With reference to FIG. 23, the information processing terminal 30 according to an embodiment of the present disclosure includes an input unit 310A, a display unit 320A, an audio output unit 330A, a control unit 340A, and a communication unit 350A.

The input unit 310A has a function of detecting input operations performed by the user. For this purpose, the input unit 310A includes a keyboard, a touch panel, various buttons, and the like. Furthermore, the input unit 310A may include, for example, a microphone that detects a voice input by the user. Furthermore, the input unit 310A may include an imaging device that takes images of the user and others.

The display unit 320A has a function of presenting various types of visual information to the user. For example, the display unit 320A displays a user interface relating to the above-described application on the basis of the control exerted by the information processing server 20. For this purpose, the display unit 320A includes various display devices.

The audio output unit 330A has a function of outputting various sounds. For example, the audio output unit 330A outputs various sounds relating to the above-described application on the basis of the control exerted by the information processing server 20. For this purpose, the audio output unit 330A includes a speaker, an amplifier, and the like.

The control unit 340A exerts overall control over the individual components of the information processing terminal 30. For example, the control unit 340A nay control activation and deactivation of each of the components. Furthermore, the control unit 340A has a function of passing various control signals generated by the information processing server 20 to the display unit 320A or to the audio output unit 330A. Furthermore, the control unit 340A may have functions equivalent to the functions of the application control unit 250 and the reflection unit 260 in the information processing server 20.

The communication unit 350A performs information communication with the information processing server 20 and the robot apparatus 1000 via the network 40. For example, the communication unit 350A receives control signals relating to the application and data relating to a reward from the information processing server 20. Furthermore, for example, the communication unit 350A transmits the information relating to a user operation detected by the input unit 310A to the information processing server 20.

The foregoing has described an example functional configuration of the information processing terminal 30 according to an embodiment of the present disclosure. Note that the functional configuration described above with reference to FIG. 23 is merely an example, and the functional configuration of the information processing terminal 30 according to an embodiment of the present disclosure is not limited to such example. For example, as described above, the information processing terminal 30 may have functions equivalent to the functions of the application control unit 250 and the reflection unit 260 in the information processing server 20. The functional configuration of the information processing terminal 30 according to an embodiment of the present disclosure may be flexibly modified in accordance with specifications and operations.

[Soundproofing Device Applied to Robot Apparatus]

The following describes a soundproofing device applied to the robot apparatus 1000. In the present embodiment, a sole pad attachable to the underside of a foot of the robot apparatus 1000 is described as an example of the soundproofing device.

(Problem to be Considered)

First, the following describes problems to be considered regarding sounds produced by the robot apparatus 1000. For example, when the above-described robot apparatus 1000 is running, a sound is produced because of contact between the paw pad 312 and the floor in a case where the floor is a wood floor or the like. This sound may be a noise unpleasant to the user. A possible solution for preventing such noise may be, for example, putting socks on the robot apparatus 1000, laying a mat, or sticking a commercially available anti-slip sheet on the sole of a foot of the robot apparatus 1000. However, it is difficult to find socks of a size suitable for the feet of the robot apparatus 1000 and, depending on the size or the like of the socks, the robot apparatus 1000 may be prevented from making a motion. Furthermore, laying a mat creates an operational restriction because the robot apparatus 1000 can be used only in a place where the mat is laid. Furthermore, a commercially available non-slip sheet may be problematic in that the sheet may be difficult to apply, or may be difficult to remove for replacement to damage the robot apparatus 1000, for example.

From these viewpoints, it is desired that the sole pad, which is an example of the soundproofing device, satisfies the following requirements. First, footsteps are made sufficiently quiet; second, slipping and other motions of the robot apparatus 1000 are neither restricted nor inhibited; third, the pad can be attached near the user's hand relatively easily and accurately; and fourth, the pad is less likely to peel off and can exert its effects over a certain period of time. On the basis of the above viewpoints, the following describes the sole pad according to an embodiment in detail.

(Example Appearance of Sole Pad)

Figure 24:
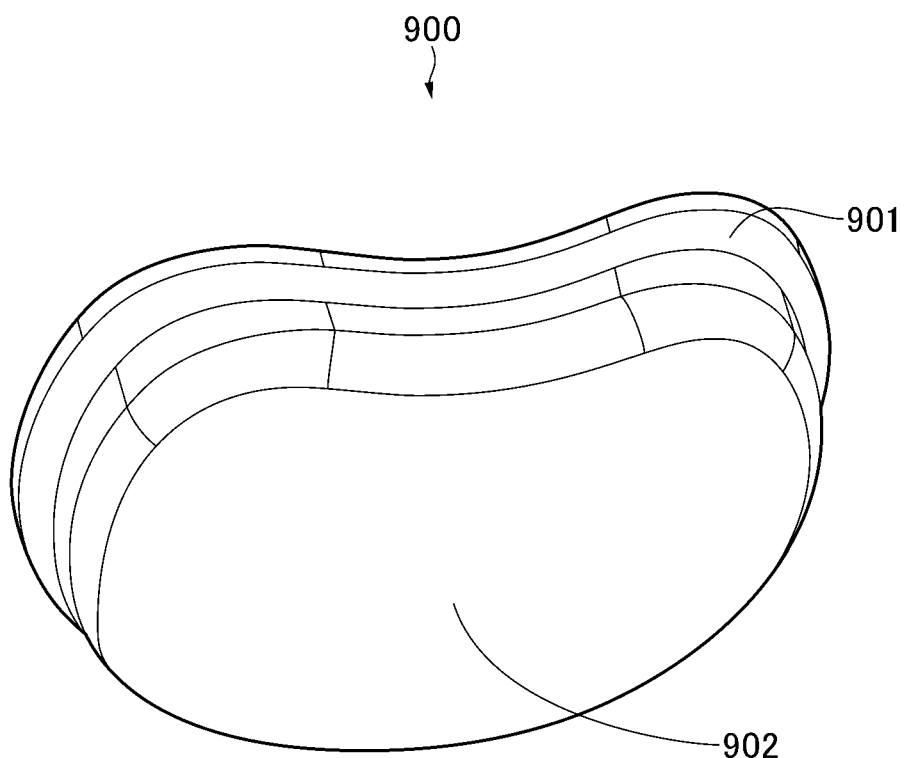
FIG. 24 is a diagram illustrating an example appearance of a soundproofing device according to an embodiment of the present disclosure.

FIG. 24 is a perspective view of a sole pad (sole pad 900) according to an embodiment. The sole pad 900 includes, for example, a sheet-like member that is track-shaped as viewed from the front and is in a convex shape from one main surface toward the other main surface. Specifically, as illustrated in FIG. 24, the sole pad 900 includes a flange-like edge 901 on the periphery, and is in a shape raised from the inner periphery of the edge 901 toward a top 902 substantially at the center of one main surface. Note that the edge 901 is not an essential component but may be created for machining and molding.

(Example Configuration of Sole Pad)

An example configuration of the sole pad 900 will now be further described with reference to FIG. 25. FIG. 25A shows a front view, a top view, and a right side view of the sole pad 900. FIG. 25B is a cross-sectional view of the sole pad 900 in the front view in FIG. 25A as taken along the section line A-A', and FIG. 25C is a cross-sectional of the sole pad 900 in the front view in FIG. 25A as taken along the section line B-B'.

As illustrated in FIG. 25A, the sole pad 900 has, for example, a track-like (oval) shape when viewed from the front. Although the size of the sole pad 900 depends on the size of a to-be-attached object to which the sole pad 900 is to be attached, as an example, the length along the longitudinal direction is set to about 25 mm (millimeters) to 30 mm and the length along the transverse direction is set to about 20 mm to 25 mm.

The sole pad 900 includes a main surface being convex (hereinafter referred to as an outer surface 905 as appropriate) on one side, and a main surface being concave (hereinafter referred to as an inner surface 906 as appropriate) on the other side. As illustrated in FIGS. 25B and 25C, the sole pad 900 has a curved shape in an arc in cross section, being in a three-dimensional (3D) form rather than a two-dimensional form such as a plate shape. As described later in detail, the outer surface 905 is the side to come into contact with the floor surface, and the inner surface 906 is the side to be attached to the robot apparatus 1000 via an adhesive member described below.

Figure 26:
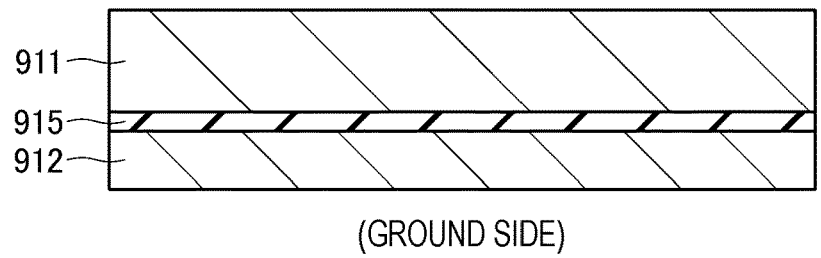
FIG. 26 is a cross-sectional view for explaining an example configuration of the soundproofing device according to an embodiment of the present disclosure.

FIG. 26 illustrates an example configuration in cross section of the sole pad 900. Note that FIG. 26 shows the sole pad 900 reshaped like a plate for ease of understanding. The sole pad 900 includes a first layer 911 forming the inner surface 906 and a second layer 912 forming the outer surface 905. The first layer 911 and the second layer 912 are bonded to each other with an adhesive layer 915 and laminated via the adhesive layer 915.

The first layer 911 has sound absorbing properties to reduce the sound of footsteps of the robot apparatus 1000. The first layer 911 is, for example, a foamed resin or an elastomer. The foamed resin is, for example, at least one of foamed polyurethane, foamed polyethylene, foamed polyolefin, or foamed rubber (for example, of a semi-closed foam (cell) type). The elastomer is, for example, at least one of silicone-based elastomer, acrylic elastomer, urethane-based elastomer, styrene-based elastomer, or the like.

The second layer 912 includes a material that avoids hindering motions, or specifically, motions involving movement of the legs (such as walking and running), of the robot apparatus 1000 as much as possible. In other words, the second layer 912 includes a material that allows the robot apparatus 1000 to perform motions in a similar (ideally identical) manner to the robot apparatus 1000 that does not have the sole pad 900 attached.

The second layer 912 includes, for example, elastic fibers (elastic yarn). Examples of elastic fibers that can be used include polyurethane-based elastic fibers, polyolefin-based elastic fibers, polyester-based elastic fibers, and a mixture of these fibers, and polyurethane-based elastic fibers, which have stretchability and elasticity, are most preferred. Note that the second layer 912 may not necessarily be made of elastic fibers only but may include an additive and the like. Furthermore, the second layer 912 may include fibers different from the elastic fibers. Note that nylon-based fibers are also included in the elastic fibers because sewing nylon-based fibers by a predetermined method can provide the nylon-based fibers with elasticity.

The adhesive layer 915 is a layer including, for example, a thermoplastic adhesive (also referred to as a hot melt adhesive or the like), which is solid at room temperature but is liquefied by heating and melting and forms a bond through cooling and solidification. Note that the adhesive layer 915 may include a thermosetting adhesive, an ultraviolet curing adhesive, or the like. Note that pressure sensitive adhesion is a kind of adhesion in the present embodiment.

(Method for Producing Sole Pad)

The following describes an example of a method for producing the sole pad 900. First, a three-layer structure illustrated in FIG. 26 is formed under an environment at room temperature. Then, the three-layer structure is placed under a high temperature (at least a temperature at which the adhesive layer 915 is liquefied), and pressed with a mold to be formed into the sole pad 900 in the shape described above (heat molding). Then, the pressed structure is allowed to cool, whereby the sole pad 900 is formed. Note that using a thermoplastic adhesive as the adhesive layer 915 can maintain the shape stability of the sole pad 900 and improve the adhesion to the first layer 911 and to the second layer 912 because the adhesive layer 915 solidifies in a shape corresponding to the shape of the sole pad 900 owing to the cooling process.

As described above, by producing the sole pad 900 having a layered structure including the first layer 911 and the second layer 912, the sound of footsteps can be further reduced while hindrance of motions of the robot apparatus 1000 can be avoided as much as possible. Note that the foregoing describes a preferred shape of the sole pad 900, but the sole pad 900 may be in another shape.

(About Adhesive Member)

In the present embodiment, the sole pad 900 is attached to the robot apparatus 1000 via an adhesive member. Specifically, the sole pad 900 is stuck on the robot apparatus 1000 via an adhesive member. Note that only the sole pad in the above-described shape may constitute a soundproofing device, or the sole pad including an adhesive member described below nay constitute a soundproofing device.

Figure 27:
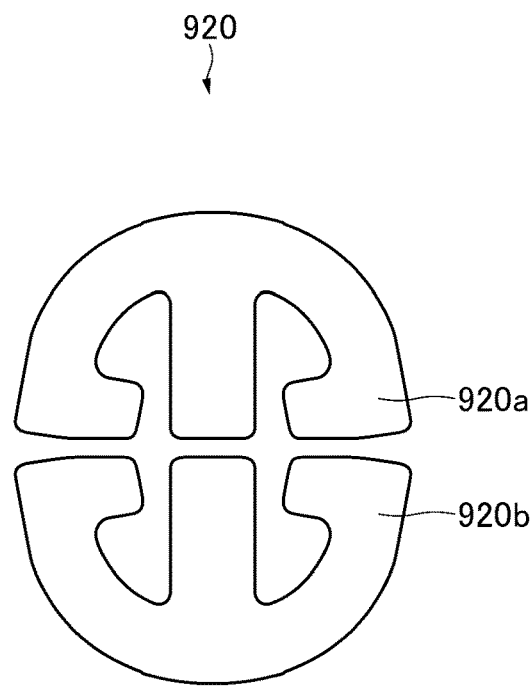
FIG. 27 is a diagram for explaining an example appearance of an adhesive member according to an embodiment of the present disclosure.

The adhesive member 920 is, for example, a double-sided tape. One main surface of the adhesive member 920 is stuck on the inner surface 906 of the sole pad 900. Incidentally, the sole pad 900 has a curved shape as described above. For this reason, it is preferable to apply, as the adhesive member 920, a tape that flexibly follows a curved surface. However, even in such cases, the tape is more likely to become wrinkled in a portion where the tape is stuck near the top 902. Therefore, it is preferable that the adhesive member 920 is shaped such that wrinkles are less likely to occur while at least a certain adhesive area is secured. FIG. 27 illustrates an example shape of the adhesive member 920. For example, the adhesive member 920 has a shape in which an E-shaped first adhesive member 920*a* and an E-shaped second adhesive member 920*b* are opposed to each other. Such shape can prevent wrinkles that may be likely to occur in an adhesion region closer to the inside of the top 902 while securing at least a certain adhesion area.

Figure 28:
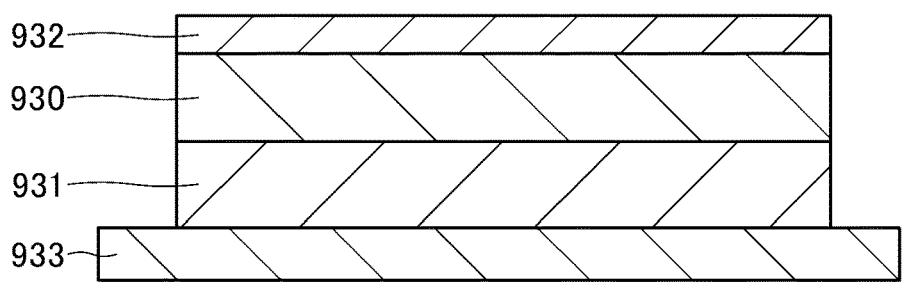
FIG. 28 is a cross-sectional view illustrating an example configuration of the adhesive member according to an embodiment of the present disclosure.

FIG. 26 is a cross-sectional view for explaining an example configuration of the adhesive member 920. As illustrated in FIG. 28, the adhesive member 920 has a configuration in which a first adhesive portion 930 and a second adhesive portion 931 are laminated. The first adhesive portion 930 and the second adhesive portion 931 are double-sided adhesive paper (double-sided tape), and are bonded to each other with an adhesive layer (not illustrated). A release paper sheet 932 is attached on one main surface (the main surface opposite to the second adhesive portion 931) of the first adhesive portion 930. A mount sheet 933 is attached on one main surface (the main surface opposite to the first adhesive portion 930) of the second adhesive portion 931.

When the mount sheet 933 is peeled off, the adhesive surface of the second adhesive portion 931 is exposed and stuck on the inner surface 906 of the sole pad 900. For example, the resulting the sole pad 900 incorporating the adhesive member 920 is provided to the user. The user peels off the release paper sheet 932 and sticks the exposed adhesive surface of the first adhesive portion 930 onto a to-be-attached object (for example, the paw pad 312 of the robot apparatus 1000).

Thus, a to-be-attached object onto which the first adhesive portion 930 is stuck is different from a to-be-attached object onto which the second adhesive portion 931 is stuck. Therefore, materials of the first and second adhesive portions 930 and 931, respectively, are appropriately determined in consideration of the adhesive compatibility with each of the to-be-attached objects.

Specifically, the first adhesive portion 930 preferably has both a certain strength for adhering to the to-be-attached object (for example, the paw pad 312 of the robot apparatus 1000) and ease of peeling off (reworkability) at the time of replacement of the sole pads 900. In the present embodiment, double-sided adhesive paper, for example, is used as the first adhesive portion 930. The second adhesive portion 931, which is to be stuck on the inner surface 906 of the sole pad 900, preferably has excellent adhesive compatibility with the material of the first layer 911 included in the inner surface 906. In the present embodiment, double-sided adhesive paper, for example, is used as the second adhesive portion 931. Note that the second adhesive portion 931 is set to have a peeling strength that allows the second adhesive portion 931 to be peeled off when the top 902 is pushed or pulled at 30 N (newton) or higher.

(Example Usage of Sole Pad)

Figure 29:
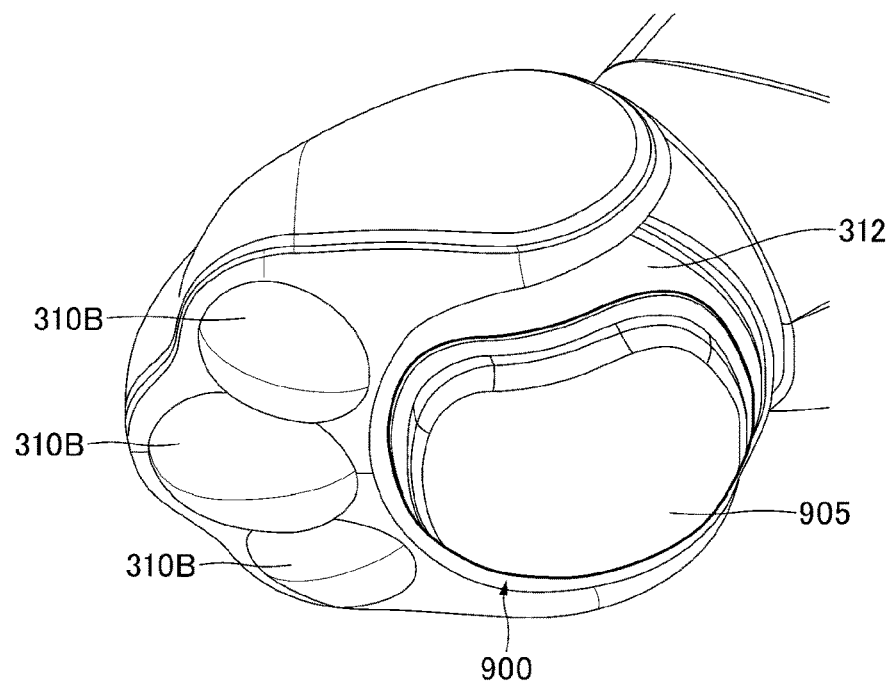
FIG. 29 is a diagram illustrating example usage of the soundproofing device according to an embodiment of the present disclosure.

FIG. 29 is a diagram illustrating example usage of the sole pad 900. As described above, when the mount sheet 933 is peeled off, the adhesive surface of the second adhesive portion 931 is exposed and stuck on the inner surface 906 of the sole pad 900. For example, the resulting the sole pad 900 incorporating the adhesive member 920 is provided to the user. The user peels off the release paper sheet 932 and sticks the exposed adhesive surface of the first adhesive portion 930 onto the sole (an example of a grounding unit) of the robot apparatus 1000, or specifically, for example, onto the paw pad 312. Since the sole pad 900 has a three-dimensional shape, specifically a curved shape as a whole, the sole pad 900 can follow and adhere to the curved surface of the paw pad 312. Therefore, the sole pad 900 can be easily stuck and, at the same time, the adhesion stability can be improved. Furthermore, the sole pad 900 can be prevented from easily peeling off and can maintain its functions over a certain period of time. The sole pad 900 is stuck on the paw pad 312 of each of the four legs of the robot apparatus 1000.

(About Thickness of Each Component of Sole Pad)

The following describes the thickness of each component of the sole pad 900. The first layer 911 has a thickness of, for example, about several millimeters. The second layer 912 has a thickness of, for example, about 0.3 to 0.7 mm. The first adhesive portion 930 has a thickness of about 0.05 to 0.2 mm. The second adhesive portion 931 has a thickness of about 0.1 to 0.2 mm. As an example, the thickness of the sole pad 900 (excluding the adhesive member 920) is set to about 2.3 mm to 2.7 mm. As another example, the thickness of the sole pad 900 (excluding the thickness of the edge 901 but including the thickness of the adhesive member 920) is set to about 2.5 to 3.0 mm. Needless to say, the thickness of each component of the sole pad 900 can be appropriately changed in accordance with the material of each component, the to-be-attached object, and so on. The sole pad 900 includes a material that mitigates friction. Thus, running and other motions with the sole pad 900 can be less affected by the sole pad 900 having a greater thickness. Furthermore, because of cushioning properties provided, the sole pad 900 can receive less shock when the foot is put on the ground, reduce the load applied to the robot apparatus 1000, and prevent wear on the sole pad 900.

(Example of Application)

Figure 30:
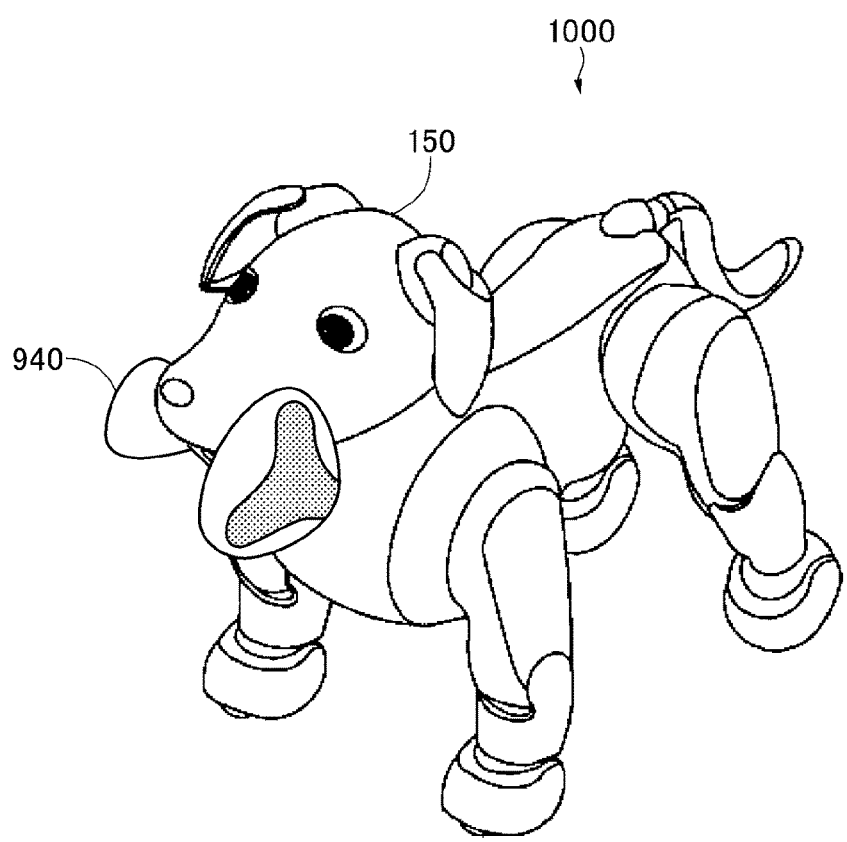
FIG. 30 is a diagram illustrating an example of motions of the robot apparatus according to an embodiment of the present disclosure.

The following describes an application relating to the sole pad 900 according to the present embodiment. Sticking the sole pad 900 on the robot apparatus 1000 may impair, for example, sliding performance of the feet of the robot apparatus 1000. Furthermore, the robot apparatus 1000 may face difficulties in making a motion of holding a toy 940 in the mouth as illustrated in FIG. 30. From these viewpoints, the present embodiment allows motions of the robot apparatus 1000 to be appropriately corrected by using motion correction information when the sole pad 900 is in use.

Figure 31:
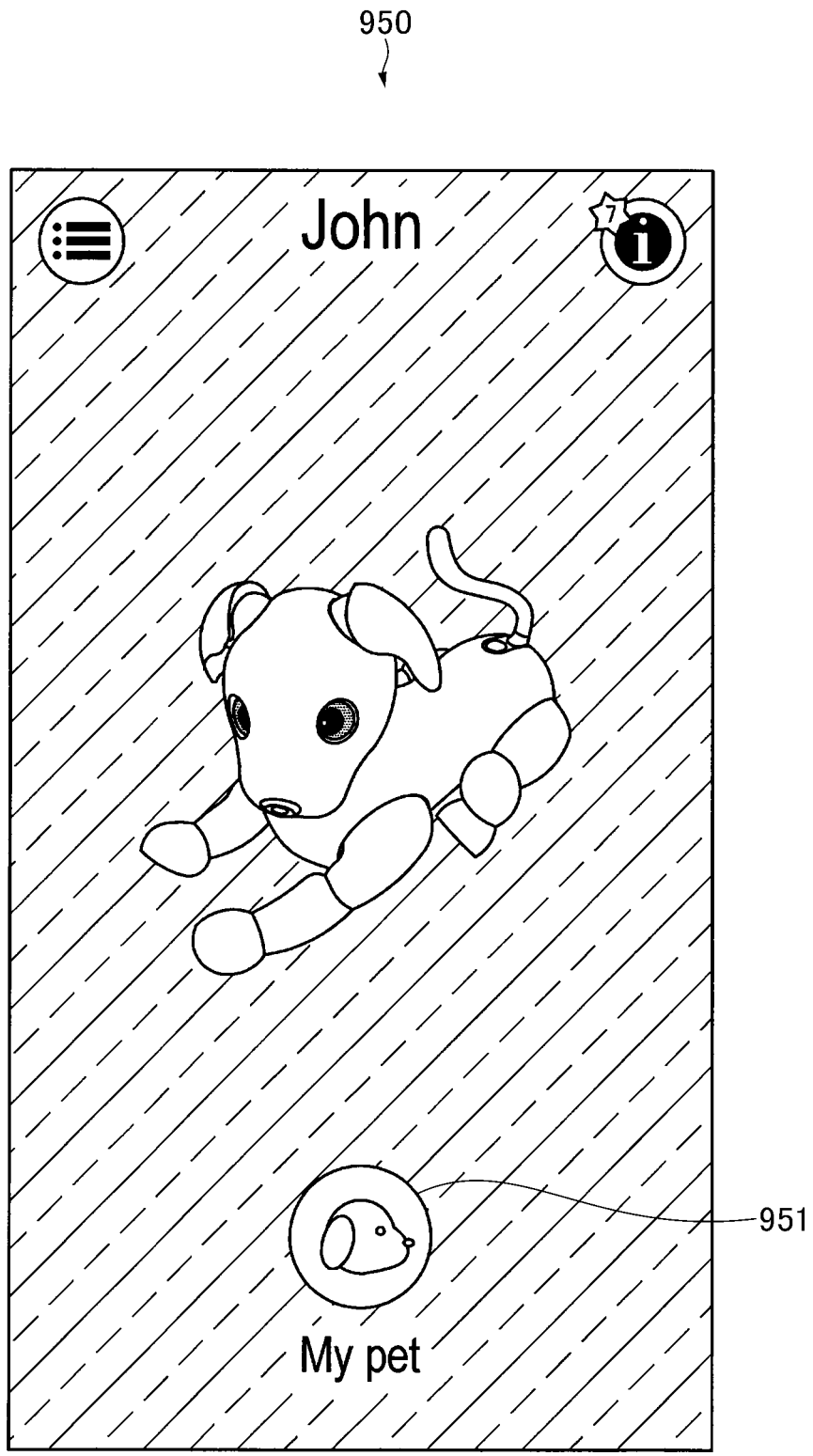
FIG. 31 is a diagram illustrating an example of a home screen of an application according to an embodiment of the present disclosure.

FIG. 31 illustrates an example of a home screen (home screen 950) displayed on the display unit 320A of the information processing terminal 30. The home screen 950 includes a display 951 for transitioning to a settings screen for the robot apparatus 1000.

Figure 32:
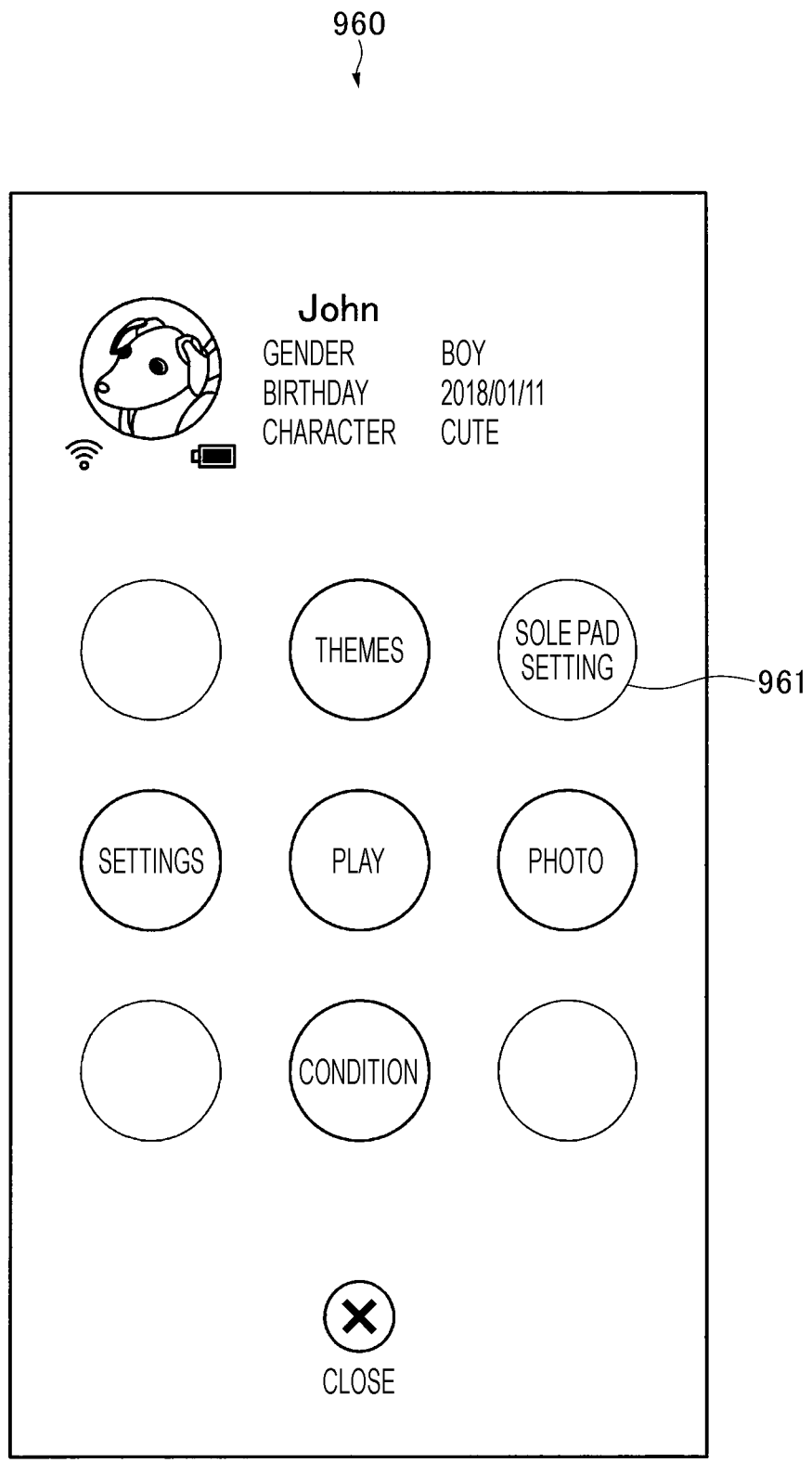
FIG. 32 is an example of a settings screen according to an embodiment of the present disclosure.

FIG. 32 illustrates an example of a settings screen 960 relating to settings of the robot apparatus 1000, changed from the home screen 950 after an operation (for example, a touch operation) is done on the display 951. The settings screen 960 includes icons for various settings of the robot apparatus 1000. An icon 961 named "Sole pad settings" is displayed among these icons. By operating the icon 961, the user can select whether or not the sole pad 900 is being used, that is, whether or not the sole pad 900 is present.

Then, when the option indicating that the sole pad 900 is present is selected, information associated with the selection is transmitted from the information processing terminal 30 to the information processing server 20. Upon receipt of the information, the information processing server 20 reads the motion correction information from the storage unit 240. The motion correction information that has been read is transmitted to the information processing terminal 30. The user transmits the motion correction information to his/her robot apparatus 1000 by operating the information processing terminal 30. Note that the motion correction information may be allowed to be directly transmitted from the information processing server 20 to the robot apparatus 1000 owned by the user of the information processing terminal 30.

Having obtained the motion correction information, the robot apparatus 1000 sets the motion correction information on the motion control unit 150A. Thereafter, the motion control unit 150A controls motions of the robot apparatus 1000 by performing control based on the motion correction information. The motion correction information is, for example, information for increasing the initial value of the amount of displacement of the head 150 for holding the toy 940 in the mouth. When motions of the robot apparatus 1000 are controlled on the basis of the motion correction information, the robot apparatus 1000 wearing the sole pad 900 is enabled to appropriately lower the head 150 to hold the toy 940 in the mouth.

The motion correction information may be other information. For example, sticking the sole pad 900 on the robot apparatus 1000 may slightly reduce sliding performance of the robot apparatus 1000 during a motion of running. Therefore, the motion correction information may be information for increasing the initial value of the driving force exerted when the robot apparatus 1000 wearing the sole pad 900 is in the motion of running. Thus, the contents of the motion correction information can be set as appropriate.

As described above, changes in motion of the robot apparatus 1000 caused by the use of the sole pad 900 can be corrected by software.

When the user stops using the sole pad 900, the user displays, for example, the settings screen 960 described above, and makes the setting to indicate that the sole pad 900 is not used. The information corresponding to the setting is transmitted from the portable information terminal 32 to the robot apparatus 1000. The motion control unit 150A in the robot apparatus 1000 recognizes, on the basis of the transmitted information, that the sole pad 900 is not used, and thereafter controls motions of the robot apparatus 1000 without using the motion correction information.

Note that in a case where the user sticks a commercial product other than the sole pad 900 on the robot apparatus 1000, there is a concern that the correction amount of a motion on the basis of the motion correction information may be inappropriate. Therefore, the motion correction information may be provided only to the user who purchased the sole pad 900.

For example, at the time of purchasing the sole pad 900, a predetermined code (a character string, a two-dimensional code, or the like) is presented to the user. When selecting the option indicating that the sole pad 900 is used on the settings screen 960, the user inputs the code as well. The code is transmitted to the information processing server 20 for authentication. The information processing server 20 may be allowed to transmit the motion correction information to the information processing terminal 30 or to the robot apparatus 1000 only when the authentication is successful.

Furthermore, the robot apparatus 1000 may autonomously determine whether or not the sole pad 900 is in use, on the basis of a change in reaction from the floor as detected by a load sensor attached to the paw pad 312 or of the result of sensing footstep sounds that differ depending on whether or not the sole pad 900 is in use. Then, having determined that the sole pad 900 is in use, the robot apparatus 1000 may correct motions on the basis of the motion correction information acquired from the outside or stored in the robot apparatus 1000 itself.

<2. Modifications>

A plurality of embodiments of the present disclosure has been specifically described above; however, the contents of the present disclosure are not limited to the above-described embodiments, and various modifications based on the technical idea of the present disclosure can be made. The following describes modifications.

In the example configurations described in the embodiments above, the first layer 911 and the second layer 912 are laminated via the adhesive layer 915, but the present disclosure is not limited thereto. A sound absorbing portion having sound absorbing properties like the first layer 911 and an elastic portion having elasticity like the second layer 912 may be integrally formed. Such configuration can be implemented by, for example, a method including injecting and foaming a resin having sound absorbing properties into elastic fibers included in the elastic portion. Furthermore, the sole pad 900 may be formed by sewing, welding, or fitting and fixing the elastic fibers so as to sandwich the resin having sound absorbing properties.

The present disclosure can also be implemented by an apparatus, a method, a program, a system, and so on. For example, a program that performs the functions described in the above-described embodiments may be allowed to be downloaded, and an apparatus that does not have the functions described in the embodiments can download and install the program, whereby the apparatus is enabled to perform the control described in the embodiments. The present disclosure can also be implemented by a server that distributes such program. Furthermore, the items described in the individual embodiments and the modifications can be combined as appropriate.

The present disclosure may have the following configurations.

(1)
A soundproofing device including:
a first layer having a sound absorbing property; and
a second layer including an elastic fiber.

(2)
The soundproofing device according to (1), further including:
an adhesive layer that bonds the first layer and the second layer.

(3)
The soundproofing device according to (2), in which
the first layer and the second layer are laminated via the adhesive layer.

(4)
The soundproofing device according to any one of (1) to (3), in which
the sound proofing device has a curved shape in cross section taken along a predetermined section line.

(5)
The soundproofing device according to (4), in which
in the curved shape, the first layer is located on a concave side and the second layer is located on a convex side.

(6)
The soundproofing device according to any one of (1) to (5), further including:
an adhesive member in which a first adhesive portion and a second adhesive portion are laminated,
in which the second adhesive portion is stuck on the first layer.

(7)
The soundproofing device according to (6), in which
a release paper sheet is stuck on a main surface of the first adhesive portion, the main surface being opposite to the second adhesive portion.

(8)
The soundproofing device according to any one of (1) to (7), in which
the soundproofing device is attachable to a robot apparatus.

(9)
The soundproofing device according to any one of (1) to (8), in which
the first layer includes a foamed resin or an elastomer.

(10)
The soundproofing device according to any one of (1) to (9), in which
the second layer includes a polyurethane-based elastic fiber.

(11)
A robot apparatus including:
a grounding unit; and
a control unit, in which
the control unit performs control to correct a motion in a case where a soundproofing device is attached to the grounding unit.

(12)
The robot apparatus according to (11), in which
the soundproofing device includes:
a first layer that is attachable to the grounding unit and has a sound absorbing property; and
a second layer that includes an elastic fiber.

(13)
A method for controlling a robot apparatus, the method including:
correcting a motion in a case where a soundproofing device is attached to a grounding unit, the correcting being performed by a control unit.

(14)
A program causing a computer to execute a method for controlling a robot apparatus, the method including:
correcting a motion in a case where a soundproofing device is attached to a grounding unit, the correcting being performed by a control unit.

REFERENCE SIGNS LIST

150A Motion control unit
312 Paw pad
900 Sole pad
911 First layer
912 Second layer
915 Adhesive layer
1000 Robot apparatus

The invention claimed is:

1. A soundproofing device comprising:
a first layer having a sound absorbing property; and
a second layer including at least one elastic fiber,
wherein the at least one elastic fiber includes a nylon-based fiber sewn into the soundproofing device.

2. The soundproofing device according to claim 1, further comprising:
an adhesive layer that bonds the first layer and the second layer.

3. The soundproofing device according to claim 2, wherein the first layer and the second layer are laminated via the adhesive layer.

4. The soundproofing device according to claim 1, wherein
the sound proofing device has a curved shape in cross section taken along a predetermined section line.

5. The soundproofing device according to claim 4, wherein
in the curved shape, the first layer is located on a concave side and the second layer is located on a convex side.

6. The soundproofing device according to claim 1, further comprising:
an adhesive member in which a first adhesive portion and a second adhesive portion are laminated,
wherein the second adhesive portion is stuck on the first layer.

7. The soundproofing device according to claim 6, wherein a release paper sheet is stuck on a main surface of the first adhesive portion, the main surface being opposite to the second adhesive portion.

8. The soundproofing device according to claim 1, wherein the soundproofing device is configured to be attached to a robot apparatus.

9. The soundproofing device according to claim 1, wherein the first layer includes a foamed resin or an elastomer.

10. The soundproofing device according to claim 1, wherein the at least one elastic fiber further includes a polyurethane-based elastic fiber.

11. A robot apparatus comprising:
a grounding unit; and
a control unit,
wherein the control unit is configured to perform control to correct a motion of the robot apparatus in a case where a soundproofing device is attached to the grounding unit, wherein the soundproofing device includes at least one layer that includes at least one elastic fiber, wherein the at least one elastic fiber includes a nylon-based fiber sewn into the soundproofing device, and wherein the control unit is implemented via at least one processor.

12. The robot apparatus according to claim 11, wherein the soundproofing device includes a first layer that is configured to be attached to the grounding unit and has a sound absorbing property, and a second layer that includes the at least one elastic fiber.

13. A method for controlling a robot apparatus, the method comprising:

correcting a motion of the robot apparatus in a case where a soundproofing device is attached to a grounding unit of the robot apparatus, the correcting being performed by a control unit implemented via at least one processor, wherein the soundproofing device includes at least one layer that includes at least one elastic fiber, and wherein the at least one elastic fiber includes a nylon-based fiber sewn into the soundproofing device.

14. A non-transitory computer-readable storage medium having embodied thereon a program, which when executed by a computer causes the computer to execute a method for controlling a robot apparatus, the method comprising:

correcting a motion of the robot apparatus in a case where a soundproofing device is attached to a grounding unit of the robot apparatus, the correcting being performed by a control unit implemented via at least one processor, wherein the soundproofing device includes at least one layer that includes at least one elastic fiber sewn into the soundproofing device, and wherein the at least one elastic fiber includes a nylon-based fiber.

15. The soundproofing device according to claim 1, wherein the at least one elastic fiber further includes a combination of polyurethane-based elastic fibers, polyolefin-based elastic fibers, and polyester-based elastic fibers.

* * * * *